(12) United States Patent
Bushey et al.

(10) Patent No.: US 6,405,159 B2
(45) Date of Patent: *Jun. 11, 2002

(54) METHOD FOR CATEGORIZING, DESCRIBING AND MODELING TYPES OF SYSTEM USERS

(75) Inventors: Robert R. Bushey; Jennifer M. Mauney, both of Austin, TX (US)

(73) Assignee: SBC Technology Resources, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,403

(22) Filed: Jun. 3, 1998

(51) Int. Cl.[7] ............................................. G06F 13/00
(52) U.S. Cl. ............................ 703/13; 705/10; 706/46; 345/326; 345/327
(58) Field of Search ................................ 703/13, 20, 7; 345/326, 337, 338; 706/46; 707/102, 103, 513; 705/10

(56) References Cited

U.S. PATENT DOCUMENTS

| | | | |
|---|---|---|---|
| 4,964,077 A | | 10/1990 | Eisen et al. .................. 364/900 |
| 5,115,501 A | | 3/1992 | Kerr ........................... 395/600 |
| 5,204,968 A | | 4/1993 | Parthasarathi ............... 395/800 |
| 5,206,903 A | | 4/1993 | Kohler et al. ................ 379/309 |
| 5,263,167 A | | 11/1993 | Conner, Jr. et al. ......... 395/700 |
| 5,299,260 A | | 3/1994 | Shaio .......................... 379/265 |
| 5,327,529 A | | 7/1994 | Fults et al. ................... 395/155 |
| 5,335,269 A | | 8/1994 | Steinlicht .................... 379/266 |
| 5,388,198 A | | 2/1995 | Layman et al. .............. 395/155 |
| 5,420,975 A | | 5/1995 | Blades et al. ................ 395/156 |
| 5,495,567 A | * | 2/1996 | Iizawa et al. ................ 395/161 |
| 5,519,772 A | | 5/1996 | Akman et al. ............... 379/265 |
| 5,535,321 A | | 7/1996 | Massaro et al. ............. 395/155 |
| 5,537,470 A | | 7/1996 | Lee ............................. 379/266 |
| 5,561,711 A | | 10/1996 | Muller ......................... 379/266 |
| 5,586,060 A | * | 12/1996 | Kuno et al. .................. 364/554 |
| 5,594,791 A | | 1/1997 | Szlam et al. ................. 379/265 |
| 5,600,781 A | | 2/1997 | Root et al. ................... 395/326 |
| 5,615,323 A | * | 3/1997 | Engel et al. ................. 395/140 |
| 5,657,383 A | | 8/1997 | Gerber et al. ............... 379/266 |
| 5,659,724 A | * | 8/1997 | Borgida et al. ............. 395/603 |
| 5,684,872 A | | 11/1997 | Flockhart et al. ........... 379/266 |
| 5,710,884 A | | 1/1998 | Dedrick .................. 395/200.47 |
| 5,727,950 A | * | 3/1998 | Cook et al. .................. 434/350 |
| 5,806,060 A | * | 9/1998 | Borgida et al. ................ 707/3 |
| 5,848,396 A | * | 12/1998 | Gerace ......................... 705/10 |
| 5,884,029 A | * | 3/1999 | Brush, II et al. ....... 395/200.32 |
| 5,991,735 A | * | 11/1999 | Gerace ......................... 705/10 |

* cited by examiner

Primary Examiner—Kevin J. Teska
Assistant Examiner—T. Phan
(74) Attorney, Agent, or Firm—Greenblum & Bernstein, P.L.C.

(57) ABSTRACT

A method for categorizing, describing, and modeling types of system users where information from the models can be used in designing a user interface. Users may have improved performance using the user interface. A list of tentative behaviors of the users is created. This list is created by identifying the goals desired for the user interface or the user models, and listing expected and desired behaviors that are relevant to these goals. The list is revised to include only those behaviors that are important or frequent based on the goals. Categorizing the behaviors is performed by obtaining information from users regarding their characteristics and behaviors. Each user's behavioral information is then converted to a score or value. The users are then mapped or charted based on which behaviors they exhibit. The mapping or charting is analyzed to identify clusters of users. These clusters define groups of users that have similar behaviors. The groups are then analyzed to produce descriptions of each group. This consists of selecting one or more users from each group and obtaining additional behavioral information. This additional behavioral information is analyzed to produce descriptions for each group. These descriptions are then used to formulate models of behaviors for each group. Information from these models can be used to design and create a user interface that helps increase user performance when using this user interface.

31 Claims, 20 Drawing Sheets

Name: _____  Sales Code: _____

City: _____  Date: _____  Time: _____

This survey is an important part of gathering information for the development of a new computer system. Your answers to this survey will be used to assist the design of a new system. If you have any questions, please ask.

1. How long have you worked as a service representative for Southwestern Bell?

_____ Less than 6 months      _____ 5 years - 10 years

_____ 6 months - 1 year      _____ 10 years - 15 years

_____ 1 year - 5 years      _____ 15 years or more years

To rate each item, please put an "X" between the tick marks on each scale. The location of your "X" should match your experience at work today. If today is not a "typical" day for you, please mark your "X" where it would match your experience on a "typical" day. Each line has a descriptor (for example, "Very Easy", "Almost Impossible") at each end of the line. There are no right or wrong answers.

2. How easy was it to recall various products and services while you were on the phone with a customer?

3. How easy was it to recall the sequence of screens to complete a customer request?

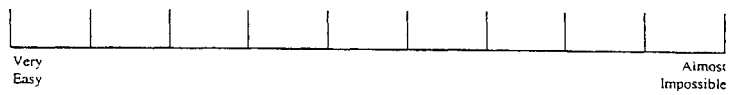

4. How often did you find customers willing to purchase additional products or services?

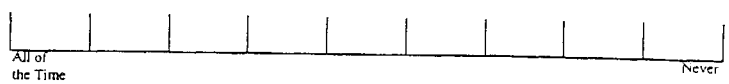

5. How often did a customer give you a "clue" as to additional product or service they might purchase?

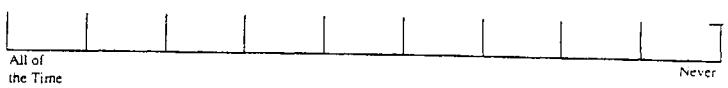

6. How often did you use "function keys" (example: PF6 for CSR or PF10 for Rates)?

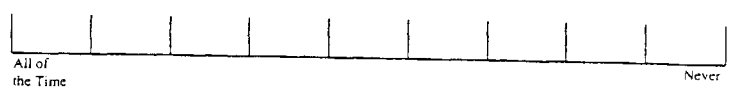

7. How often did you "command" to a different screen (example: Command FO or Command LS)?

Figure 3

| TITLE | ANCHORS | DESCRIPTION |
|---|---|---|
| Mental Demand | Low/High | How much mental and perceptual activity was required (e.g., thinking, deciding, calculating, remembering, looking, searching, etc.)? Was the task easy or demanding, simple or complex, exacting or forgiving? |
| Physical Demand | Low/High | How much physical activity was required (e.g., pushing, pulling, turning, controlling, activating, etc.)? Was the task easy or demanding, slow or brisk, slack or strenuous, restful or laborious? |
| Temporal Demand | Low/High | How much time pressure did you feel due to the rate or pace at which the tasks or task elements occurred? Was the pace slow and leisurely or rapid and frantic? |
| Performance | Good/Poor | How successful do you think you were in accomplishing the goals of the task set by the experimenter (or yourself)? How satisfied were you with your performance in accomplishing these goals? |
| Effort | Low/High | How hard did you have to work (mentally and physically) to accomplish your level of performance? |
| Frustration Level | Low/High | How insecure, discouraged, irritated, stressed, and annoyed versus secure, gratified, content, relaxed, and complacent did you feel during the task? |

FIGURE 6

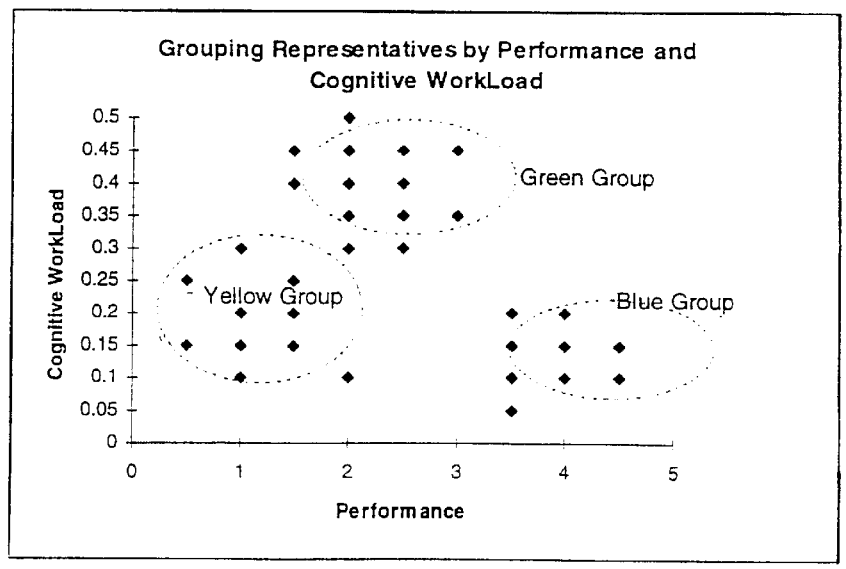

FIGURE 7

Name: _____  Sales Code: _____

City: _____  Date: _____  Time: _____

This survey is an important part of gathering information for the development of a new computer system. Your answers to this survey will be used to assist the design of a new system. If you have any questions, please ask.

Your job experience has many factors that can affect the design of a system. These factors may include how demanding your job is or the stress you feel. We would like you to read the factors below and then evaluate them on the next page.

DEFINITIONS:

Mental Demand.    How much thinking, deciding, calculating, remembering, looking, and searching was required ? Was your job today easy and simple (low mental demand) or demanding and complex (high mental demand) ?

Time Pressure.    How much time pressure did you feel due to the rate or pace of your job today ? Was the pace slow and leisurely (low time pressure) or rapid and frantic (high time pressure) ?

Frustration.    How did you feel during your job today? Satisfied, relaxed, and happy (low frustration) or discouraged, stressed, and annoyed (high frustration) ?

On the next page, you will be asked to rate and compare these items.

FIGURE 8

RATINGS.

To rate each item, please put an "X" between the tick marks on each scale. The location of your "X" should match your experience at work today. If today is not a "typical" day for you, please mark your "X" where it would match your experience on a "typical" day.

MENTAL DEMAND

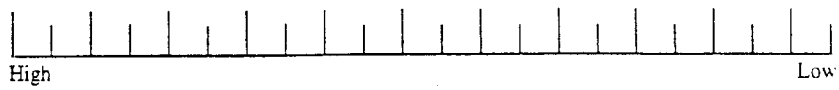

High                                    Low

TIME PRESSURE

High                                    Low

FRUSTRATION

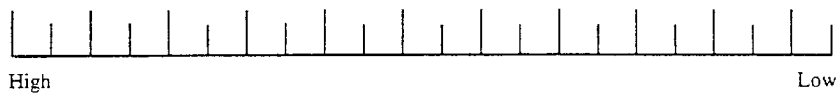

High                                    Low

COMPARISONS:

In each of the three boxes below, please circle the item which affected you more in your job today. For example, between Time Pressure and Mental Demand, if you were more affected by Time Pressure doing your work today, you would circle Time Pressure. If, however, you were more affected by Mental Demand, then you would circle Mental Demand. Again, if today is not a "typical" day for you, please circle each item which typically affects you more in your job. Each box must have one and only one item circled.

| Time Pressure | Mental Demand | Frustration |
|:---:|:---:|:---:|
| Vs. | Vs. | Vs. |
| Mental Demand | Frustration | Time Pressure |

FIGURE 9

| Step | Description |
|---|---|
| 1 | Establish a method to identify each service representative that is consistent with and fulfills the same purpose as the anonymous user ID. |
| 2 | Update and localize the survey instructions given to each service representative. Update the detailed procedures for the administration of the survey. |
| 3 | Prepare an agenda for the orientation meetings. These meetings will introduce the TLX and survey to the service representatives. This meeting will also serve as the vehicle to answer their questions. Separate meetings would be held for managers and service representatives. |
| 4 | Administer the TLX instrument and the survey. Have a method to collect the surveys ensuring that the user identification is written on each form. This would be accomplished 2 weeks before task analysis site visit. |

FIGURE 10

| Step | Description |
|---|---|
| 1 | Input or import the performance data into spreadsheet format. Arrange for the survey data to be validated and input or imported into spreadsheet format. Graph performance with the TLX, demographics, and survey factors. |
| 2 | Construct a multi dimension chart with the following parameters: dollar sales, number of calls handled, cognitive workload, and ease of customer clues identified. Rotate the orientation of this chart searching for natural groupings of individuals. |
| 3 | Investigate and consider various combinations of parameters to identify logical groupings for service representatives. The outcome of this step is a list of groups and the service representatives within each grouping. |
| 4 | From each grouping, choose which service representatives will be the best representative of that grouping in their task approach and strategy. These service representatives will be targeted for a detailed task strategy analysis. The outcome for this step is a list of service representatives that can be used for interviews. |

FIGURE 11

| DESIGN INFORMATION | TASK TYPE: SEQUENTIAL | TASK TYPE: PARALLEL |
|---|---|---|
| Functionality: Coverage | Any GOMS | Any GOMS |
| Functionality: Consistency | NGOMSL | |
| Operator Sequence | CMN - GOMS<br>NGOMSL | CPM - GOMS |
| Execution Time | CMN - GOMS<br>KLM<br>NGOMSL | CPM - GOMS |
| Procedural Learning Time | NGOMSL | |
| Error Recovery | Any GOMS | Any GOMS |

FIGURE 13

| STEP | DESCRIPTION |
|---|---|
| 1 | Confirm the amount of time that will be available for this observation. Adjust the number of observations and the level of detail to make best use of the time available. |
| 2 | There is no equipment needed for this task analysis. |
| 3 | Ensure that a sufficient number of blank data collection forms (task analysis) are available. |
| 4 | This level of task analysis does not capture or record video. Notes kept on the data collection form will capture critical video type activities. |
| 5 | This level of task analysis does not capture or record audio. Notes kept on the data collection form will capture critical audio type activities. |
| 6 | Ensure that the instructions and debrief form are sufficient to capture the information necessary to construct valid user models. |
| 7 | Service representatives will be identified as members of one of the groups (blue, green, or yellow). Each group will have a set of unique questions and task analysis areas of focus. These notes, from the data collection form, will assist construction of their respective user model. |

FIGURE 14

| STEP | DESCRIPTION |
|---|---|
| 1 | Confirm the amount of time that will be available for this observation. Adjust the number of observations and the level of detail to make best use of the time available. |
| 2 | The equipment needed for this level of task analysis is video, audio, keystroke, and screen capture. |
| 3 | Ensure that a sufficient number of blank data collection forms (task analysis), video and audiotapes, and other recording media are available. |
| 4 | This level of task analysis captures and records video. Notes will also be kept on the data collection form and will capture critical video type activities. This analysis will record video (hands / keyboard and screen) on tape. |
| 5 | This level of task analysis captures and records audio. Notes kept on the data collection form will capture critical audio type activities. This analysis will record audio (both the "staged" customer and the service representative) on tape. |
| 6 | Ensure that the instructions and debrief form are sufficient to capture the information necessary to construct valid user models. |
| 7 | Service representatives will be identified as members of one of the groups (blue, green, or yellow). Each group will have a set of unique questions and task analysis areas of focus. These notes, from the data collection form, video, and audio, will assist construction of their respective user model. |

FIGURE 15

| STEP | DESCRIPTION |
|---|---|
| 1 | Confirm the amount of time that will be available for this observation. Adjust the number of observations and the level of detail to make best use of the time available. |
| 2 | The equipment needed for this level of task analysis is video, audio, keystroke, eye tracking, and screen capture. |
| 3 | Ensure that a sufficient number of blank data collection forms (task analysis), video and audiotapes, and other recording media are available. |
| 4 | This level of task analysis captures and records video with the emphasis on the eye tracking. Notes will also be kept on the data collection form and will capture critical video type activities. This analysis will record video (hands / keyboard and screen) on tape and eye tracking data electronically. |
| 5 | This level of task analysis captures and records audio. Notes kept on the data collection form will capture critical audio type activities. This analysis will record audio (both the "staged" customer and the service representative) on tape. |
| 6 | Ensure that the instructions and debrief form are sufficient to capture the information necessary to construct valid user models. |
| 7 | Service representatives will be identified as members of one of the groups (blue, green, or yellow). Each group will have a set of unique questions and task analysis areas of focus. These notes, from the data collection form, video, eye tracking, and audio, will assist construction of their respective user model. |

FIGURE 16

Key Press File Format.

| FIELD 1 | FIELD 2 | FIELD 3 | FIELD 4 | FIELD 5 | FIELD 6 | FIELD 7 |
|---|---|---|---|---|---|---|
| Record ID | Date | Time | Key ID | X Location | Y Location | 2 Click |

FIGURE 17A

Eye Movement File Format.

| FIELD 1 | FIELD 2 | FIELD 3 | FIELD 4 | FIELD 5 | FIELD 6 |
|---|---|---|---|---|---|
| Record ID | Date | Time | Duration | X Location | Y Location |

FIGURE 17B

Screen Display File Format.

| FIELD 1 | FIELD 2 | FIELD 3 | FIELD 4 |
|---|---|---|---|
| Record ID | Date | Time | Screen ID |

FIGURE 17C

Screen Display Objects File Format.

| FIELD 1 | FIELD 2 | FIELD 3 | FIELD 4 |
|---|---|---|---|
| Screen ID | Object ID | X Location of Left Object Side | Y Location of Upper Object Side |
| Screen ID | Object ID | X Location of Left Object Side | Y Location of Lower Object Side |
| Screen ID | Object ID | X Location of Right Object Side | Y Location of Upper Object Side |
| Screen ID | Object ID | X Location of Right Object Side | Y Location of Lower Object Side |

FIGURE 17D

| Call Category | System RT | Talking | Keying | Reading |
|---|---|---|---|---|
| Disconnect | 10% | 83% | 4% | 3% |
| New Service | 15% | 72% | 8% | 5% |
| Add Caller ID | 31% | 56% | 6% | 7% |
| Add Call Waiting | 28% | 59% | 7% | 6% |
| Average | 21% | 68% | 6% | 5% |

FIGURE 21

| TASK | DESCRIPTION |
|---|---|
| 1 | Construct the flow of the tasks at the motor, mental, customer, and system response level of detail. This flow of tasks should begin at the customer's first contact with SBC and end with the completion of the customer's request. This description should identify the user's navigation, parallel processing, and cross-selling opportunities of the various user strategies. |
| 2 | This construction process needs to recognize the key mental and motor user activities including: control of activity flow, information verification, and cognitive activities (memory retrieves, forgets, recalls). |
| 3 | Identify differences between behaviors within a group, i.e. within group behavior variability. |
| 4 | Identify differences between models between groups, i.e. between group behavior variability. |
| 5 | The primary guideline for building user models focuses on the level of detail. That is, it is critical to recognize to what level of detail will the models have to be at in order to represent the strategy differences adequately. The general guideline is that the model should remain at the highest level possible – only dropping to additional detail levels to represent critical differences. |
| 6 | One important data item that needs to be included is the task time duration. This task time duration represents the time that a task consumes and the degree of time variability of those durations. |

FIGURE 22

| STEP | PROCEDURE |
|---|---|
| 1 | Include user models from each of the user groups. Have good reasons for excluding any user groups from this procedure. |
| 2 | Select at least two functions for each user group. By default, one easy and one difficult task is an obvious choice. There can be other compelling reasons to choose some other tasks. |
| 3 | Select at least one service representative from each user group. These service representatives can be selected at random. |
| 4 | For the selected functions / tasks (in step 2), conduct a task analysis of the service representatives selected in step 3. |
| 5 | The expected results will be that 80% of the actual performance will be aligned with the model, while 20% represents an opportunity for refinement. For this 20%, gain additional details about the task analysis to improve the model. |
| 6 | Test the revised model for validity. If additional validation is desired, go to step 1. |

FIGURE 23

METHOD FOR CATEGORIZING, DESCRIBING AND MODELING TYPES OF SYSTEM USERS

BACKGROUND OF THE INVENTION

1. Field of the Invention

This invention relates to modeling system users, and more specifically to modeling system users to aid in the design of user interfaces.

2. Description of the Related Art

A user model is a representation of the set of behaviors that a user actually exhibits while performing a set of tasks. The purpose of user modeling is to build a model of the behaviors used when a user interacts with a system. For example, if the system the user interacts with is a computer system, then the interaction occurs primarily with the computer interface (i.e. keyboard, monitor, mouse, and sound).

An interface design team may be assembled to gather information on users in order to design a user interface. If the interface design team is emphasizing performance, the behaviors and characteristics that emerge are items related to the expert user. The expert users usually can effectively articulate their suggestions and are normally interested in achieving performance. Therefore, interviewers from the interface design team pay close attention to the comments and suggestions of these expert users. Another aspect for giving credence to the expert user is that experts are usually the people whom get promoted and are likely to be chosen as members on the design team. The problem is, of course, that other types of users do not have the same behaviors and capabilities as these experts and, thus, their needs are not represented in the requirements gathering phase of the interface design. Expert users are typically a smaller percentage of the user population. If the interface is designed for the expert user, this leaves a high percentage of users where the interface is unsuitable or less than optimum.

In some design projects, ease of learning, training, or novice aspects are emphasized to a great extent. This is particularly true when a trainer is in a lead position on the design team or when management places a high priority on reducing the costs of training. However, having the novices' needs be dominant in the interface design phase is no better than permitting the experts' needs to be dominant. One group is still being used for the design to the exclusion of the other group's needs. Novices generally also comprise a very small percentage of the user population. Therefore, designing an interface just for the novice user may improve their performance, but may jeopardize overall performance of other users.

If behaviors of users were condensed into a single set of behaviors, the set definition would be so wide and variable that it would have a limited contribution to the interface designers. That is, the characterization of the users would be so broad, that the designers could not determine what interface options would make a difference in the users' performance.

If there is no overwhelming performance issue or training issue that directs the team, then anecdotal behavioral information is obtained for a variety of users. User requirements information is usually gathered by more than one person from the design team. Thus, a great deal of discussion ensues following the information gathering on users because each gatherer may have interviewed a different user who probably had different capabilities and a different view of the system and a different set of needs. Therefore, the resulting set of user requirements is a composite or average view of the user needs. In this situation, many of the needs of users do indeed surface but they are not organized in a manner that is intuitively obvious. Also, interface designs to meet these needs are not necessarily optimally beneficial to any one group of users. This method of designing an interface for the composite or average user thus presents a substantial risk that very few users will be fully accommodated by the interface.

Another current practice is that if users are categorized, they are done so on an informal basis, based primarily on the opinion and judgment of the local operating management. Even though these individual users may be identified, their needs are mixed in with the needs of other users without regard as to the group they represent. Also, with current practice, the descriptions of user behavior are done anecdotally, not statistically. Quantitative performance results are not incorporated into the behavioral descriptions. User models are generally not constructed primarily because there is only one user representation and all of the design team members think they know the needs of the single user.

The user modeling goal should thus characterize the users in such a way that the designers can incorporate the users' behaviors into the interface design so that performance is maximized (while acknowledging and compensating for the human element). The expectation is that the user models would also allow for the prediction of performance after the newly designed interface is operational. The style and type of user interface can significantly impact the resulting performance.

Therefore, a method is needed to model system users that produces information that can be used in the design of an interface that maximizes the performance of the users, and also allows for the prediction of performance after the newly designed interface is operational.

SUMMARY OF THE INVENTION

Accordingly, the present invention is directed to a method for categorizing, describing, and modeling system users that substantially obviates one or more of the problems arising from the limitations and disadvantages of the related art.

It is an object of the present invention to provide a method that accurately categorizes, describes, and models a user's behavior while interacting with a system.

It is a further object of the present invention to provide a method for modeling system users that provides qualitative and quantitative models.

It is also an object of the present invention to provide a method for modeling types of system users that allows for the prediction of performance after the new user interface is operational.

Another object of the present invention is to provide a method for modeling system users that aids in designing an interface more familiar and comfortable to users because particular components of the interface will be better suited for their particular style.

The foregoing objects are achieved by the present invention that preferably comprises a method for modeling types of system users. Behaviors of a variety of types of users are categorized into two or more groups. Descriptions of the behaviors of each user group are created based on behaviors of selected users from each user group. Models are generated for the described behaviors of each user group. A user interface can then be designed using information from these models. The performance of the variety of types of users is improved when the interface is used by these users.

The behaviors may include navigation behaviors, parallel processing behaviors, and customer sales behaviors. Categorizing may comprise charting the behaviors on a chart having two, three, four, or more dimensions. The dimensions may include performance measures, cognitive workload measures, behavioral measures, or user characteristic measures.

The descriptions of the behaviors of each user group may be related to the similarities within each group or the differences between each group. The descriptions of the behaviors of each user group may comprise listing the tasks by frequency and importance and selecting from the most important tasks for detailed task analysis. The detailed task analysis may comprise capturing the perceptual, cognitive, and motor stages of human behavior, and quantifying each stage as to processing speed and cognitive load. The detailed task analysis may be accomplished by using a modified GOMS methodology.

The models may include qualitative models which may include how the users within a specific group behave in certain situations, or how the users within a specific group perform certain functions. The models may include quantitative models which may incorporate the capability to make numerical performance predictions. The models of the behaviors may be constructed in an interactive process that results in the models representing the strategies and activities for each user group. The models of the behaviors may be validated, and the validating of the models may use actual data.

The present invention may also preferably comprise a method for modeling behaviors of interface users where the models are used to provide data for designing a system user interface. A list of user behaviors is created. Important behaviors based on the desired goals for the system user interface are identified. Data related to the important behaviors are obtained from a plurality of users. The data is graphed where the axises of the graph may be related to two or more important behaviors of the plurality of users. Clusters in the graphed data are identified, where the clusters represent groups of users with similar important behaviors. At least one user is selected from each user group. Additional data from the selected users is obtained, the additional data related to the selected users' behaviors. The selected users' behaviors are described based on analyzing the additional data. Models of said selected users' behaviors are created based on the descriptions of the selected users' behaviors. A user interface may be created using information from the models. The plurality of users' performance may be improved when using the user interface.

Additional features and advantages of the present invention will be set forth in the description to follow, or may be learned by practice of the invention. The objectives and other advantages of the invention will be realized and attained by the methods particularly pointed out in the written description and claims hereof together with the appended drawings.

It is to be understood that both the foregoing general description and the following detailed description are exemplary and explanatory, and are intended to provide further explanation of the invention as claimed.

The accompanying drawings are included to provide a further understanding of the invention and are incorporated in and constitute a part of this specification, illustrating one embodiment of the invention. The drawings, together with the description, serve to explain the principles of the invention.

BRIEF DESCRIPTION OF THE DRAWINGS

The present invention is illustrated by way of example, and not by way of limitation, by the figures of the accompanying drawings in which like reference numerals refer to similar elements, and in which:

FIG. 3 is an exemplary user survey form;

FIG. 6 is table of a NASA-TLX rating scale definition;

FIG. 7 is an exemplary graph of performance and cognitive workload according to the present invention;

FIG. 8 shows exemplary instructions and definitions for a cognitive workload modified NASA-TLX survey;

FIG. 9 is an exemplary cognitive workload modified NASA-TLX survey;

FIG. 10 shows an exemplary procedure for administering a NASA-TLX survey;

FIG. 11 shows an exemplary procedure for combining and analyzing survey data;

FIG. 13 is table of task types and design information used decide on a GOMS technique;

FIG. 14 is a table of exemplary steps for user observation task analysis;

FIG. 15 is a table of exemplary steps for user video task analysis;

FIG. 16 is a table of exemplary steps for user eye tracking task analysis;

FIG. 17A shows an exemplary data file format for key press;

FIG. 17B shows an exemplary data file format for eye movement;

FIG. 17C shows an exemplary data file format for screen display;

FIG. 17D shows an exemplary data file format for screen display objects;

FIG. 21 shows an exemplary primary simulation outcome;

FIG. 22 is a table of exemplary steps to construct a user model; and

FIG. 23 shows an exemplary procedure to refine a user model.

DETAILED DESCRIPTION OF THE PREFERRED EMBODIMENTS

Figure 1:
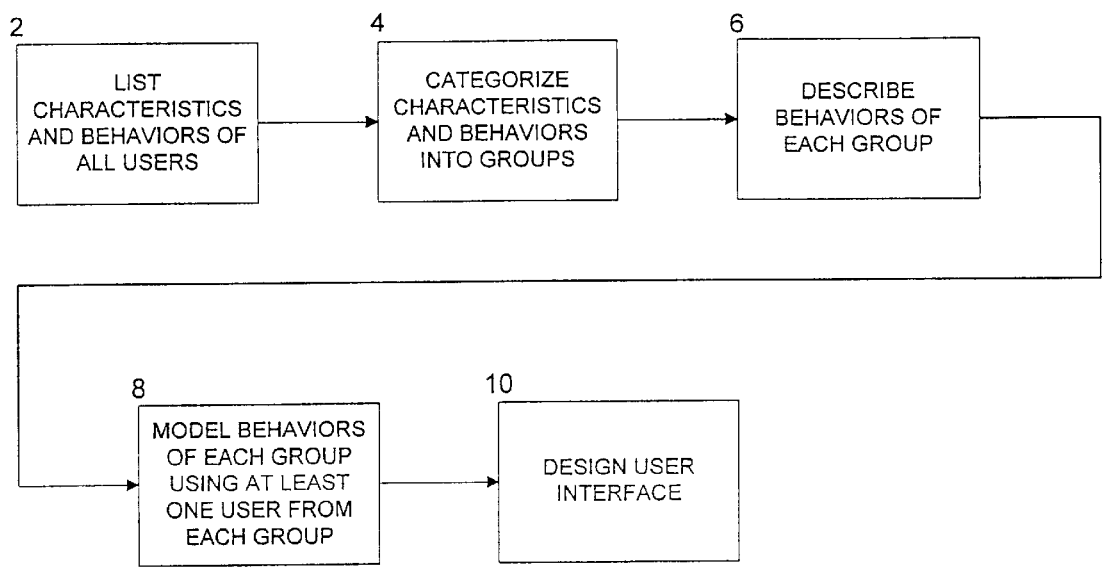
FIG. 1 is a block diagram of the present invention.

The present invention integrates the activities of categorizing, describing, and modeling into one single consistent approach. FIG. 1 shows a block diagram of the present invention. The first activity performed is to create a tentative list of characteristics and behaviors of the users 2.

This tentative list is created by identifying the goals desired for the user interface or the user models, and listing expected and desired behaviors that are relevant to these goals. The list is then revised to include only those characteristics and behaviors that are important based on the goals. Then, the activity of categorizing 4 begins. Information is obtained from users regarding their characteristics and behaviors. This information may be obtained from a survey completed by the users, or from some other means. Each user's characteristics and behavioral information is then converted to a score or value. The users are then mapped or charted based on which behaviors they exhibit. The mapping or charting is analyzed to identify clusters of users. These clusters define groups of users that have similar behaviors. The user population may be charted on a multidimensional chart and the groupings or clusters emerge from analysis of the chart data. The dimensions of the chart are the important behaviors and may include performance measures, cognitive workload measures, behavioral measures, or user characteristic measures.

The groups are then analyzed to produce descriptions of each group as shown in activity block 6. This consists of selecting one or more users from each group and obtaining additional behavioral information. This additional behavioral information is analyzed to produce descriptions for each group. These descriptions are then used to formulate models of behaviors 8 for each group. Information from these models can be used to design and create a user interface 10. The methods and means to accomplish these activities will now be discussed in further detail.

The present invention may be applied to various types of users of a variety of system interfaces. One embodiment will be utilized by being described in detail to illustrate the present invention. This embodiment uses the present invention to model system users such as service representatives that interface with customers and use a computer interface to help service their customers' needs. For example, this computer interface may be used by service representatives for the purpose of negotiating new services with customers. When a customer calls the service representative and requests new or additional services, the representative can accomplish the sales and setup of those requested services through the use of the computer interface.

Categorizing User Behavior

As shown in FIG. 1, after the activity 2 of listing the behaviors of all users, the next activity 4 is to categorize the behaviors into groups. The user population is categorized into several groups. Preferably, the number of groups may range from 3 to 5 groups, however, more than this number would still be within the spirit and scope of the present invention. This categorization effort is accomplished based upon similar behavioral characteristics between users that are important to system interface design and use. Just as having a single representation is an oversimplification of the user population, representing each and every user individually is not practical. There are hundreds to thousands of users for some major systems. Therefore, it is a reasonable compromise to group users into 3 to 5 groups and represent the needs of those groups as the user interface needs.

Figure 2:
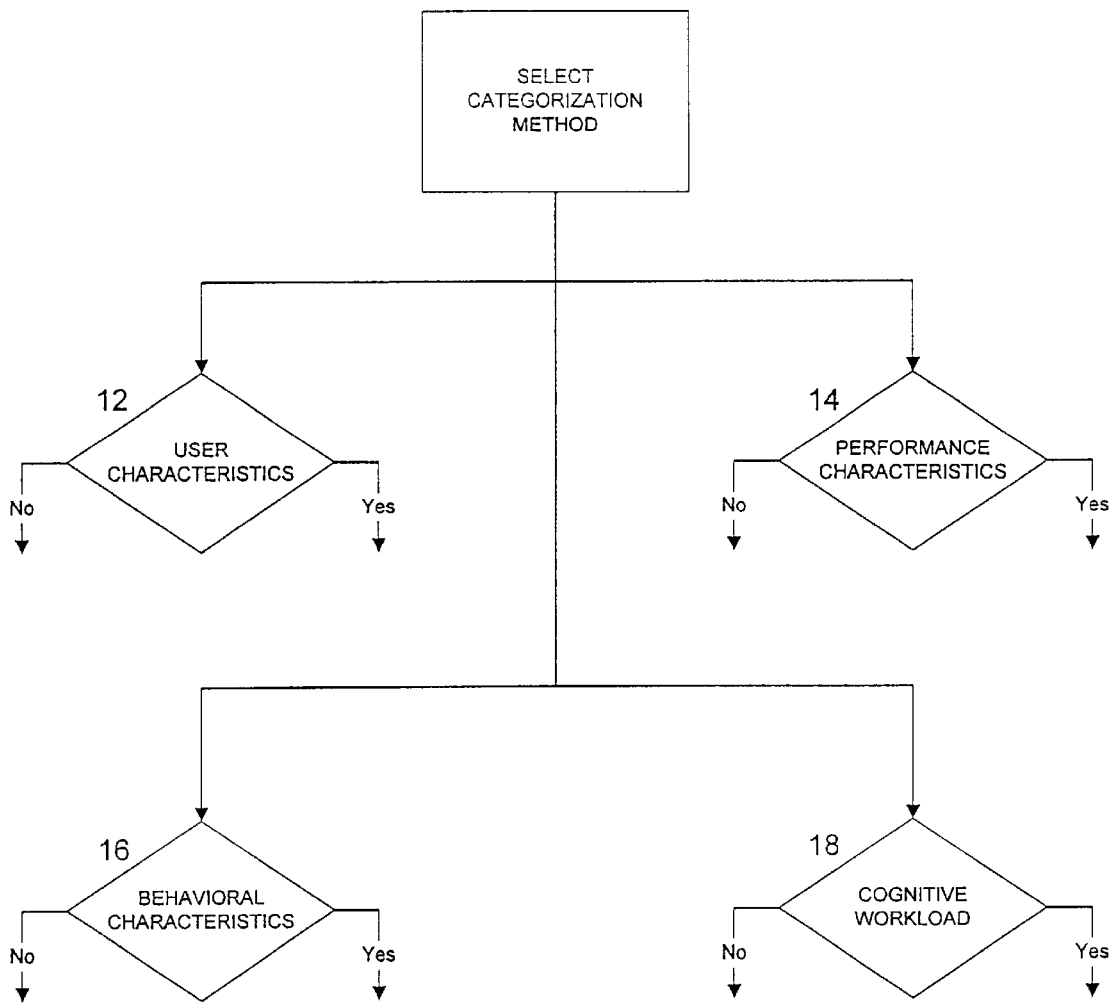
FIG. 2 is a flowchart of the categorization methods according to the present invention.

Four methods used to categorize users, although others may be used, are shown in FIG. 2. These categorization methods are: user characteristics method 12, performance characteristics method 14, behavioral characteristics method 16, and cognitive workload method 18. An appropriate method is selected based on the types of users, and the goals for the system interface desired. A combination of methods may also be used, and still be within the spirit and scope of the present invention, if this is desired based on the users and goals of the user interface.

User characteristics refer to user qualities or traits that are measurable and differ between users. The specific user characteristics that facilitate the categorizing of users may be general or may be task/job dependent. In this possible method for grouping users, the users self-rate their user characteristics. Using the service representative embodiment as an example, a general characteristic that may be used to group users could be their ability to recall information. Users who rate themselves as having difficulty recalling the various packages/services offered may benefit from a menu-based interface. Menu-based interfaces require less mental demand (memorizing) than other types of interfaces. Users who rate themselves as having no difficulty recalling the various packages/services offered may benefit from an interface where menus can be skipped and shortcut keys can be used.

Task/job dependent user characteristics may also facilitate the categorizing of users. Using the service representative embodiment, users who indicate that customers almost never give clues that they will purchase additional products or services may prefer an interface that prompts them to cross-sell additional products or services. However, users who indicate that customers almost always give clues that they will purchase additional products or services may prefer an interface that does not prompt them to cross-sell. These users probably already have strategies that enable them to cross-sell successfully.

An exemplary survey that captures user characteristics that may facilitate the categorizing of users is shown in FIG. 3. Questions 1, 2, 3, 6, and 7 are more general user characteristics while questions 4 and 5 are more task/job dependent.

Performance is also a method to facilitate the categorizing of users. For the service representative embodiment, four months of performance measures are acquired for these users. These performance measures include: gross dollar sales per month, net dollar sales per month, retention of sales, "cross" or "up" sales per month, number of orders per month, dollar sales per order, and number of incoming calls per month.

The number of orders per month may separate the order takers from the rest of the users. The order takers are users who, as quickly as possible, set up the package or service the customer has requested. They do not cross-sell other packages or services to the customer; they quickly take an order, hang up, and quickly take an order again. Order takers are expected to have a larger number of orders per month as compared with the other users. However, they may have a lower average of dollar sales per order.

Cognitive workload measurement is comprised of the demands affecting the human operator throughout transfer and transformation of inputs into outputs. Similarly, workload has been defined as the proportion of information processing capacity, resources, or effort, which are expended in meeting system demands. Three major concepts define the framework for workload assessment and include system demands, processing resources and effort expenditure, and operator and system performance.

System demands are defined as environmental, situational, and procedural. Environmental demands consist of temperature, humidity, noise, illumination, etc. Situational demands are the characteristics and arrangement of displays and controls, the dynamics of a vehicle, etc. Procedural demands are the duration of a task, standard system operating procedures, special instructions given to the operator, etc.

Processing resources and effort expenditure are indicative of internal abilities of an operator. Processing resources refer to an operator's ability to receive and process the system demands. The multiple resources theory is used to determine how an operator processes information. According to this theory, rather than having a single resource, an operator's processing system consists of several separate capacities or resources that are not interchangeable. In addition, according to this theory, there are three stages of processing, namely an encoding stage, a central processing stage, and a responding stage. There are also two modalities of processing (visual and auditory), two codes of processing (verbal and spatial), and two types of responses (vocal and manual).

Similar to the processing resources, effort expenditure refers to an operator's ability to manage the system demands. This ability may be continually changing (e.g., physiological readiness, experience and motivation) or may stay relatively constant (e.g., general background, attitude, personality, psychophysical factors).

Training also affects processing resources and effort expenditure. Although there are no comprehensive theories on how training/practice affect workload, research has shown automatic behavior to decrease cognitive workload. By increasing the levels or amount of practice, workload decreases. The increased levels of practice can lead to automatic behavior. This type of behavior does not appear to require conscious use of processing resources or effort expenditure on the part of the operator.

The effects of training on performance and workload typically result from changes in the manner the task is performed. Such changes may include a transformation to filter out unnecessary data, the application of increasingly effective coding techniques, and the evolution of internal models to allow perceptual anticipation and motor programming. Thus, operator strategy also affects processing resources and effort expenditure. Operator skill (the operator's ability to choose the appropriate strategy) also may affect processing resources and effort expenditure.

This demonstrates that workload is a multidimensional construct. The multidimensional aspects are reflected in the multidimensional elements themselves and in the interaction of these elements to determine a load. The implications of this conceptual framework are that no single measure of workload may be adequate, rather a plurality of measures may be required to assess workload. In addition, a variety of workload assessment techniques are required to assess each major factor or component of workload. Before a workload assessment technique is chosen, a number of properties for evaluating workload measurements will be discussed.

The basic properties that any measurement should have are the properties of validity, and reliability. However, because cognitive workload is multidimensional, many other properties are also helpful in determining which measurement to choose. These properties include sensitivity, diagnosticity, global sensitivity, intrusiveness, implementation requirements, operator acceptance, and transferability.

Sensitivity is a primary property of cognitive workload. It refers to a measurement's ability to detect different degrees of workload imposed by the task or system. The degree of sensitivity required is directly associated with the question to be answered by the workload technique. Two basic questions asked with regards to workload are: (1) is an overload occurring which demonstrates a degradation in operator performance, and (2) is there a potential for such an overload to exist.

Diagnosticity refers to the ability to discriminate differences in specific resource expenditures, as related to the multiple resources model. For example, a secondary tracking task may demonstrate there is an overload for motor output when an operator is performing a typing task.

Global sensitivity refers to a measurement's capability to detect changes in workload without clearly defining why the change is occurring in workload. A globally sensitive measure cannot discriminate differences in specific resource expenditures.

Intrusiveness is a measurement's ability to interfere with the primary task. An intrusive task may not affect performance (an operator who is not overloaded may compensate) but it may affect the workload measure (an operator may have felt more workload, heart rate may have increased, etc.). In an operational environment, this property is extremely important to control, otherwise, operator performance may decrease and operator workload may increase due to the chosen workload measurement technique and not to changes in the task.

Implementation requirements include any equipment, instruments, and software that are necessary to present the task. It also includes data collection procedures and any operator training that is necessary for proper use of the measurement.

Operator acceptance is important to ensure that a measurement will reflect accurate data. If an operator does not accept the measurement, the measurement could be ignored (e.g., the operator ignores the secondary task or randomly rates the task with a subjective measurement), the operator could perform at a substandard level, or operator workload could increase due to the measurement not due to the task.

Transferability is the ability of a measurement to be utilized in a variety of applications. Transferability is based on the specific measurement and task or system to be measured. For example, a tracking task (i.e. one where a specific user action is monitored) may be transferable, but only to a system that will be measured with a secondary task, which focuses on visual, spatial, and manual skills.

For the service representative embodiment of the present invention, the cognitive workload (mental workload) method 18 is chosen because of its ability to obtain a variety of information. However, any categorization method used would still be within the spirit and scope of the present invention. Cognitive workload has been described in several publications. Two examples are O'Donnell, R. D., and Eggemeier, F. T. (1986). Workload assessment methodology, and K. R. Boff, L. Kaufman, and J. Thomas (Eds.), *Handbook of perception and human performance: Volume II. Cognitive processes and performance* (pp. 42/1–42/49). New York: Wiley.

Figure 4:
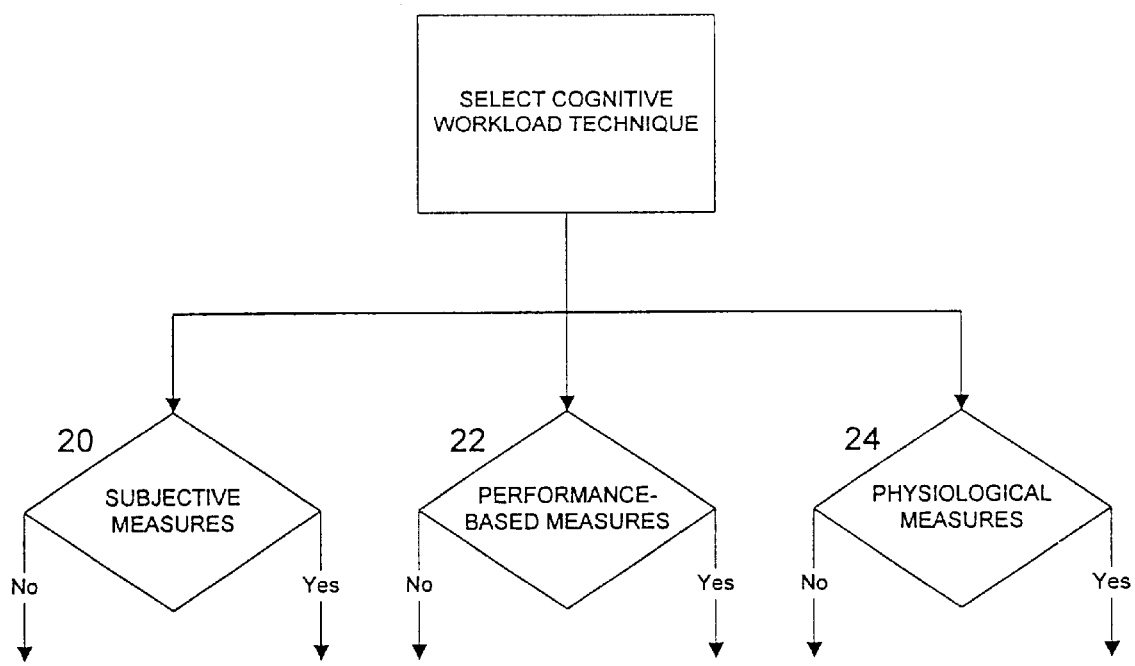
FIG. 4 is a flowchart of the selection of cognitive workload techniques according to the present invention.

Different types of cognitive workload techniques are shown in FIG. 4 They are subjective measures techniques 20, performance-based measures techniques 22, and physiological measures techniques 24. One or more of these methods is selected, again based on the types of users, and the goals for the system interface desired. For the service representative embodiment, both subjective measures technique and performance-based measures are used. However, any cognitive workload technique, or combination of techniques can be used, and such use would still be within the spirit and scope of the present invention.

For subjective measures, users are required to judge and report the level of workload experienced during the performance of a specific task or system. These measures are usually based on rating scales. Theoretically, the operator can accurately report an increase in effort or capacity expenditure associated with subjective feelings. Some of the more researched subjective assessment techniques include the Modified Cooper-Harper, Subjective Workload Assessment Technique (SWAT), NASA-Task Load Index (NASA-TLX), and Subjective Workload Dominance (SWORD).

A reason for using subjective measures is that they typically are highly sensitive to detecting overloads. They tend to be globally sensitive and are not intrusive since they are performed after the task is completed. In addition, the implementation requirements are low (e.g., a pencil and paper, possibly some training on the measurement) and operator acceptance is usually high. However, subjective measures are not always diagnostic, especially in facilitating the redesign of a task or system. The few subjective techniques that have some diagnostic abilities are very generalized. Some subjective techniques also have problems with operator acceptance.

Physiological measures examine the physiological response to the task requirements. Typically, users who experience cognitive workload, display changes in a variety of physiological functions. Some of the physiological measurements of workload include heart rate, heart rate variability, sinus arrhythmia, EEGs, ERPs, and eye blink.

Physiological measures tend to be extremely sensitive, some are highly diagnostic, while others are globally sensitive. However, physiological measures are intrusive, have a high degree of implementation requirements (e.g., for an EEG, an EEG machine, an oscilloscope, and electrodes are needed), and are expected to have low operator acceptance in operational environments.

Performance-based measures are broken down into primary task measures and secondary task measures. Primary task measures evaluate aspects of the operator's ability to perform the intended task. Typically, all measures of cognitive workload should include the primary task performed by the operator. Primary tasks are only sensitive to overloads in workload, they are not typically sensitive to the potential for an overload to exist. Some primary tasks are globally sensitive. Since they are the primary task, they are not intrusive and have high operator acceptance. However, primary tasks are not diagnostic, and are generally not transferable. Their implementation requirements vary.

Secondary task measures are categorized as either a subsidiary task paradigm or a loading task paradigm. In the subsidiary task paradigm, secondary task measurements evaluate how much of one or more resources are being consumed by the primary task. Users put emphasis on primary task performance. Secondary tasks are added to the primary task to impose an additional load on the operator. Analyzing performance decrements on secondary tasks determines how much resources are consumed. Properly choosing secondary tasks determines which resources are consumed.

In the loading task paradigm, secondary task measurements determine when and how much the primary task deteriorates. Users put emphasis on secondary task performance while the degree of difficulty of the primary task is manipulated. Two or more primary tasks may also be compared for task deterioration with this paradigm.

Secondary tasks are extremely diagnostic and may be sensitive to potential overloads. However, if a secondary task is chosen which is not employing the same resources that the primary task is, employing the secondary task will not be sensitive to changes in workload and may not display expected overloads. It is usually recommended that a battery of secondary tasks be used and this can be time consuming. Secondary tasks are, by nature, intrusive, tend to have high implementation requirements (e.g., for a tracking task, a joystick, screen, and computer are needed), and are expected to have low operator acceptance in operational environments.

Figure 5:
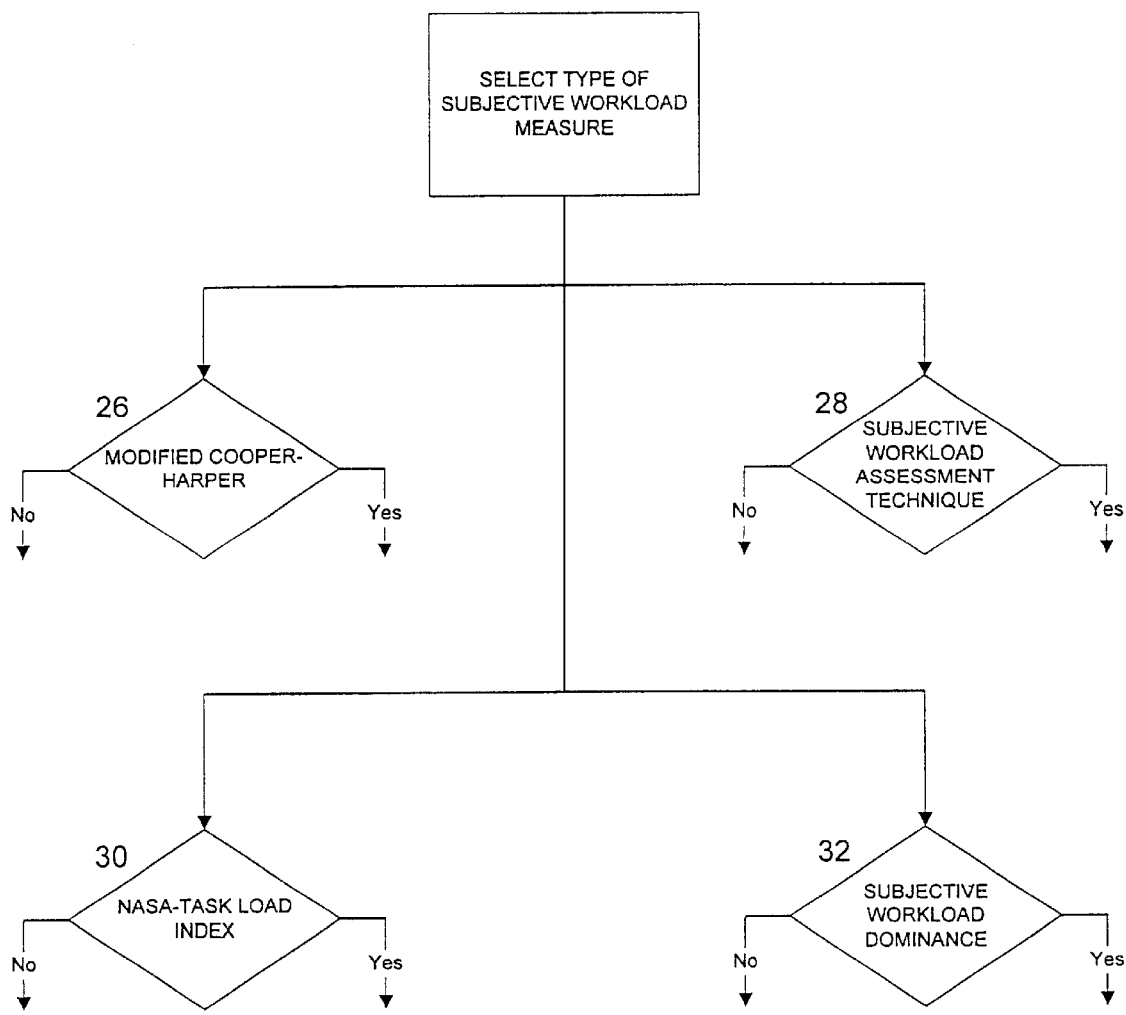
FIG. 5 is a flowchart of the selection of types of subjective workload measures according to the present invention.

For the service representative embodiment, a subjective measure is chosen. As shown in FIG. 5, a decision must be made to select between various subjective assessment techniques such as the Modified Cooper-Harper 26, Subjective Workload Assessment Technique (SWAT) 28, NASA-Task Load Index (NASA-TLX) 30, or Subjective Workload Dominance (SWORD) 32. For the service representative embodiment, a NASA-Task Load Index (NASA-TLX) technique is chosen. However, any subjective workload measure chosen would still be within the spirit and scope of the present invention.

The NASA-TLX evolved from the NASA Bipolar scale. Similar to SWAT, the Bipolar scale was developed with the consideration that workload is multidimensional, thus, a measurement of workload should also be multidimensional. Developed after SWAT, the Bipolar was designed with nine scales because the Bipolar authors did not believe the scales in SWAT were sufficient. The Bipolar also recognizes that from task to task, the scales may vary in importance, and allows users to acknowledge these differences. In addition, this technique was developed to contain diagnostic scales, which could be rated based on subjective importance.

The NASA-TLX inherited properties from the Bipolar scale with the exception that the NASA-TLX has six scales to allow for an easier implementation. The scales represent task characteristics (mental demand, physical demand, and temporal demand), behavioral characteristics (performance and effort), and operator's individual characteristics (frustration). These scales and their corresponding definitions are shown in FIG. 6

TLX also added the ability to consider individual differences through the weighting of the workload scales. TLX involves a two-part procedure consisting of both ratings and weightings. After the operator completes the task, numerical ratings are obtained for each of the six scales. The operator is given both the rating scale definition sheet and a rating sheet. On the rating sheet, there are twenty intervals with endpoint anchors for each of the six scales. Users mark the desired location for each scale. A score from 5 to 100 is obtained on each scale by multiplying the rated value by five. Depending on the situation, rating sheets, verbal responses, or a computerized version are considered practical.

In the second part of TLX, users weigh the six scales. Paired comparison procedures are implemented for 15 comparisons, accounting for comparisons between all of the scales. Users choose the scale which most significantly created the level of workload experienced in performing a specific task. For each task and operator, each scale is tallied for the number of times it was chosen in the paired comparisons. Scales can have a tallied value between zero and five. Each new task requires users to rate and weigh the scales upon its completion.

The ratings of each scale are arranged in a raw ratings column. Adjusted ratings are calculated by multiplying the raw ratings by the corresponding tallied scale scores. The adjusted ratings for all six different scales are then summed. The total sum is divided by 15 (for the number of paired comparisons) to obtain the weighted workload score (ranging from 0 to 100) for the operator in that task condition. Analysis of the data can then be performed.

Due to the multidimensional properties of workload, some level of diagnosticity may be distinguished by using TLX. Generalized conclusions may be made based on operator strategies and on weightings and judgments of the six dimensions of mental demand, physical demand, temporal demand, performance, effort, and frustration.

TLX is not considered intrusive because it is performed after the task is completed. Implementation requirements are typically low; the definition sheet, rating sheet, and paired comparisons are needed for every operator and task. Some time may be required for users to practice with and familiarize themselves with the scales. Operator acceptance is typically high and TLX is usually transferable.

In addition, TLX was robust against slight (e.g. 15 minutes) delays in operator ratings and in non-controlled order effects. TLX is also considered potentially more sensitive at low levels of workload compared to SWAT, and TLX's paired comparison procedure may be omitted without comprising the measure.

For the service representative embodiment, a goal is to determine how a new system interface should be designed to increase the performance of service representatives. Since a current system interface exists, the question must then be asked, why use a cognitive workload assessment technique to determine how the system interface should be re-designed? Before this question can be answered, the current system interface and how it is used by the service representatives to sell products, services, and packages must be examined.

In a typical existing system interface, service representatives need to examine a variety of screens depending on the products, services, or packages to be sold. It is assumed that due to the number of screens a service representative must examine, performance is not at an optimum level. It is also assumed that by redesigning the system, performance should improve. Therefore, first the performance of the service representatives on the current system needs to be determined. It is expected that the performance data will display a range of values and that groups of these values will represent selling strategies. For example, service representatives who have high levels of performance (high sales revenue per month) are expected to use different selling strategies from service representatives who have low levels of performance. Thus, one of the goals of the system interface design team is to determine the strategies used by service representatives and their corresponding performances. Once this information is known, it will be more feasible to know how the system needs to be redesigned. This information should provide direction to interface designers on how to redesign the system to improve performance. It may also direct what types of strategies should be taught to the lower performing group(s).

Based on performance data alone, groups of service representatives are not easily distinguishable. Different strategies result in different performances. In addition, it is expected that each of the strategies may result in a range of performances. Thus, performances from the different strategies are expected to overlap, making it unclear which service representatives use which strategies. Since one of the goals of the system interface design team is to determine the strategies used by service representatives, it is important to know which service representatives use the same or different strategies.

For the service representative embodiment, there are three reasons for using a cognitive workload assessment technique to determine if and how a new system should be designed. First, a cognitive workload assessment technique will result in one of three possible outcomes: all service representatives are overloaded, none of the service representatives are overloaded, or some of the services representatives are overloaded. If the results are that some or all of the service representatives are overloaded, the system should typically be redesigned to lower the load. If none of the service representatives are overloaded, the system may not necessarily have to be redesigned. It may be cost justified to train different strategies to the service representatives who are performing at a lower level. Thus, a cognitive workload assessment technique will help to determine if the system should be redesigned.

Second, since it is expected that degrees of cognitive workload correlate to types of strategies, measuring cognitive workload is an indirect way to measure types of strategies. Furthermore, measuring cognitive workload is quick, easy to perform, and inexpensive. Conversely, determining each service representative's strategy for each task would take a considerable amount of time, would require a lot of effort, and would be very expensive. By obtaining cognitive workload measurements, groups of service representatives may be parsed out and a small number of service representatives in each group may be examined for their strategies. A graph of cognitive metric and performance metric is expected to help parse out the groups, given the assumption that the degree of cognitive workload and user characteristics are highly correlated to strategy. An example of this graph is shown in FIG. 7.

In this figure, the Blue Group has higher performance and lower cognitive workload, the Green Group has medium performance and higher cognitive workload, and the Yellow Group has lower performance and lower cognitive workload. From this data, individuals in each group could be examined for strategies used during their tasks. It is expected that strategies within a group would be similar, but between groups would be different.

Through understanding the strategies, a new system may be designed more appropriately. Also, knowledge of the strategies used by the service representatives facilitates the system redesign such that better strategies are easier to use and understand, and other strategies are not hindered in the system redesign. A goal in redesigning the system is to improve performance in as many of the groups as possible. However, the redesign should not trade off one group's improved performance for another group's impaired performance. The redesign should also result in an overall improvement in performance compared to the old level of performance. The lack of improved performance would suggest that no group improved because both improvements and detriments had been redesigned into their tasks.

Third, a cognitive workload assessment technique may provide clues to improve the system. The diagnosticity of the technique may give some insight as to where the problems which result in lower levels of performance occur and how to design the system to eliminate such problems. For example, using a multidimensional subjective technique, it may be found that one group feels overloaded on the dimension of mental effort. It may be they feel there is too much to remember, and if the system was redesigned as menu-based to lower the use of memory, the mental effort load would be decreased to a more satisfactory level.

In addition to these three reasons for using a cognitive workload assessment technique to determine how a new system should be designed, some of these techniques may also be used to evaluate the newly designed system. Some of the cognitive workload assessment techniques may be used to determine if the new system decreases the service representatives' loads. Several cognitive workload assessment techniques can be used at any stage of development. A properly chosen technique can signal design problems early in the development of a new system.

Any system interface design effort would be benefited by measuring the cognitive workload of the current tasks. As mentioned previously, this information may help determine if the system needs to be redesigned. In addition, the cognitive workload of a task should not be measured relative to another task; rather it should be an absolute measurement for the system interface design team. This restricts SWORD from being recommended. The measurement should give diagnostic information so that if the system needs to be redesigned, information from the cognitive workload measure will help indicate what should be redesigned and how it should be redesigned. This restricts MCH from being recommended. It is unclear whether the measure needs to be sensitive to low levels of workload. Therefore, SWAT or NASA-TLX could be recommended as the subjective measure for the service representative embodiment. However, NASA-TLX was chosen over SWAT as the recommended technique because sensitivity to low levels of workload may be required. The recommendation is also based on some of NASA-TLX's properties. As compared to SWAT, NASA-TLX is fast and easy to perform. Service representatives will probably have a higher acceptance of it than of SWAT.

Although The NASA-TLX is thus seen to be best for the service representative embodiment, it was modified. The NASA-TLX currently contains six scales, namely, mental demand, physical demand, temporal demand, performance, effort, and frustration. Since service representatives are not affected by physical demands, this scale was removed from the TLX. In addition, effort is a difficult scale to define. In pre-study testing, effort was confused with mental demand. Therefore, effort was also removed from the TLX. Furthermore, the performance scale was also removed from the TLX since users may view the performance scale as a scale related to their performance reviews.

The modified TLX for use in the service representative embodiment thus contains the three scales of mental demand, temporal pressure, and frustration. Similar to the original NASA-TLX technique, these three scales will be rated and compared. However, service representatives will only perform one rating based on their tasks that day; each task will not be individually rated. An exemplary cognitive workload TLX survey is shown in FIGS. 8 and 9. Instructions and definitions for the survey are shown in FIG. 8, while the survey is shown in FIG. 9. Exemplary steps outlining procedures for administering the survey and modified NASA-TLX instrument, using the service representative embodiment, is shown in FIG. 10.

After the survey data is received from the users, it is combined and analyzed. This includes graphing or charting the data and identifying groupings or clusters on the graph or chart. These groups suggest users with similar behaviors. One or more users from each group is selected. These selected users will undergo a more detailed analysis. An exemplary outline of steps and procedures for combining and analyzing the survey data is shown in FIG. 11.

Describing User Behavior

A task analysis is a method employed to enable one to understand how a user performs a specific task and to describe this behavior. Task analyses allow interface designers an understanding of what must be done to accomplish a task. They may also obtain insight into how a task can be better accomplished and what is needed to better accomplish the task. All of this information facilitates the development of a new system interface.

In addition, task analyses may help system interface requirements development by determining what functionality is necessary or desired in a system interface. Functionality refers to those functions in a system that users find useful in accomplishing their tasks. Furthermore, functionality together with a well-designed interface should result in a system that is easy to learn and use.

Behavioral characteristics are user characteristics that are not self-rated and are usually determined through a task analysis. Previously, it was noted that the user characteristics are measured through a survey which is self-rated by the user. Behavioral characteristics are not necessarily known to the user or may not be well communicated. Examples of behavioral characteristics are the user's actual method of navigation and use of serial processing or parallel processing.

Users may not notice when they use menus, compared to when they use shortcut keys. A task analysis, where the user is being monitored, may provide more insight into behavioral characteristics since the user is actually performing the task. Each action the user performs to accomplish the task is recorded in a task analysis. The record can show when menus are used versus shortcut keys versus other navigational procedures for a user. Different groups of users are expected to use different navigational techniques.

Users may also not be familiar with their processing methods. Serial processing is the ability to perform one action (mental or motor) at a time, while parallel processing is the ability to perform more than one action. Whether a user tends towards serial processing or parallel processing may be best determined in a task analysis. As previously noted, each action that the user performs to accomplish the task is recorded in a task analysis. The analysis record can show when the user is performing one action at a time versus performing a variety of actions at the same time. Different groups of users are expected to use different processing techniques.

Since behavioral characteristics are not observed until the task analysis has been performed, these characteristics are used to validate the categorization of the groups of users. If the previously categorized groups of users are found to have different behavioral characteristics, then the groups will need to be re-categorized. It is important that the behavioral characteristics within the groups be similar so that the models are accurate representations of the groups.

For this embodiment of the present invention, a subset of individuals in each categorized group are observed for behaviors used to perform their tasks. Two behaviors employed by the service representatives that made a predominant impact on their job performance were the number of cross-selling attempts made to the customer and the length of the call. For example, representatives who did not make any cross-selling attempts and quickly performed the service requested by the customer, quickly completed a large number of customer sales. This behavior typically resulted in a large number of low revenue calls. While other service representatives talked longer to the customer to determine the most likely types of products or services that they could successfully cross-sell to the customer. This behavior typically resulted in a smaller number of higher revenue calls.

Based on the normalized number of cross-selling attempts per call and normalized average length of call, the representatives were grouped by similar behaviors.

Each of the service representatives observed were charted in a graph where the normalized average number of cross-selling attempts was graphed on the x-axis and the normalized average length of call was graphed on the y-axis. This was done for each observed service representative for a variety of call types (task types). Groups of representatives who were observed to have similar behaviors over different call types were grouped together. These behavior-based groups were then used to validate the cognitive and performance categorized groups.

The behavior-based groups were also used in the GOMS analyses. A GOMS analysis is another type of task analysis that was used to facilitate the description of the different groups of users.

A GOMS model is a task analysis method that indicates the steps a user must accomplish to complete a task in the form of a model. The model can be used to help choose the appropriate functionality for a system. The model can also calculate if the task is easy to learn and use.

GOMS has empirically validated the relationship between human cognition and performance. GOMS is based on the Model Human Processor. The Model Human Processor is a model of a user interacting with a computer. It can be described by a set of memories and processors together with a set of principles.

First, sensory information is acquired, recognized, and placed into working memory by perceptual processors. A cognitive processor then handles the information and commands the motor processor to perform physical actions. The principles guide how the processors function. This is a simplified model of a user interacting with a computer, but it does facilitate the understanding, predicting, and calculating of a user's performance relevant to human-computer interaction.

GOMS is an acronym that stands for Goals, Operators, Methods, and Selection rules. GOMS uses these components to model a human's interactions with a computer. Goals refer to the user's goals. What does the user want to accomplish? Goals are typically broken down into subgoals. Operators are the actions the user performs with the computer interface to accomplish the Goals. Examples of Operators are keystrokes, mouse movements, menu selections, etc. Methods are the arrays of subgoals and Operators that perform a Goal. Since GOMS models are not based on novice performance, the Methods are routine. Selection Rules are personal rules users follow to determine which Method to use if more than one Method can accomplish the same Goal. The Goals, Operators, Methods, and Selection rules combine to model how a user performs a task.

GOMS models cover three general issues. First, they cover lower-level perceptual-motor issues. For example, GOMS discerns the effects of interface arrangement on keystroking or mouse pointing. Second, GOMS models display the complexity and efficiency of the interface procedures. Eventually the user must determine and execute a procedure to perform useful work with the computer system. Third, GOMS models examine these components and how they interrelate in the design of the system.

GOMS models are approximate and include only the level of detail necessary to analyze the design problem. It is not necessary to have all parts of an analysis examined at the same level. Some design situations may require some areas of analyses to be examined to the level of primitive Operators (Operators at the lowest level of analysis), while other areas may be analyzed with higher-level Operators. GOMS models allow selective analyses.

Ideally, a GOMS model will produce quantitative predictions of performance earlier in the development cycle than prototyping and user testing. In addition, this model will also predict execution time, learning time, errors, and will identify interface components that lead to these predictions. Changes to these interface components will produce quantitative changes to the predictions of performance.

One of the major assumptions that is universally established for the GOMS models is that of the experienced user. That is, that the behavior that is being described with GOMS task analysis is that of an experienced user. This experienced user assumption and its significance is now discussed.

The term experienced user is meant to identify users whose performance and behavior has stabilized. In particular, the behavior and performance of an experienced user is considered to be stabilized to the point that the particular user accomplishes their tasks in the same manner and style for each task execution. This means that their task time would be somewhat consistent. This also means that their error rate would be minimal. Stabilized performance also means that the user is not still learning the system, but has established (and repeats) their interaction, behavior, and style. If the user is still learning the system, it would be expected that their task time would improve as they gain additional experience.

Even more significant than task time and error rate, the experienced user has established a defined strategic approach to task completion. That is to say, that the user has worked with the system long enough to adapt where it is appropriate, and selected an approach to task completion that best matches the user's capabilities and style. Thus in defining an experienced user, one is really looking for the following characteristics: stable task time, minimal errors, and established task strategy.

The expert user and the experienced (lower performance) user may differ in their established task strategies, resulting in different types of user models for the two types of users. These models could then be used to facilitate the design of a system for the different groups.

Within a grouping of users, the behaviors interacting with the system will be generally similar. Users from each group would be selected and their behavior observed and documented. A CPM-GOMS approach has been modified to describe and document these user behaviors. Using the method according to the present invention, behaviors are examined for similarities within a group and differences between groups of users. For example, a group of expert users may, to different degrees, use parallel processing for their cognitive activities while novices may use serial processing. The emphasis of these descriptions focuses on behaviors that affect performance and are then incorporated into the user models. There are limits to the descriptions, both in time consumption and user knowledge. Only the functions that are frequent and important are formally described.

Figure 12:
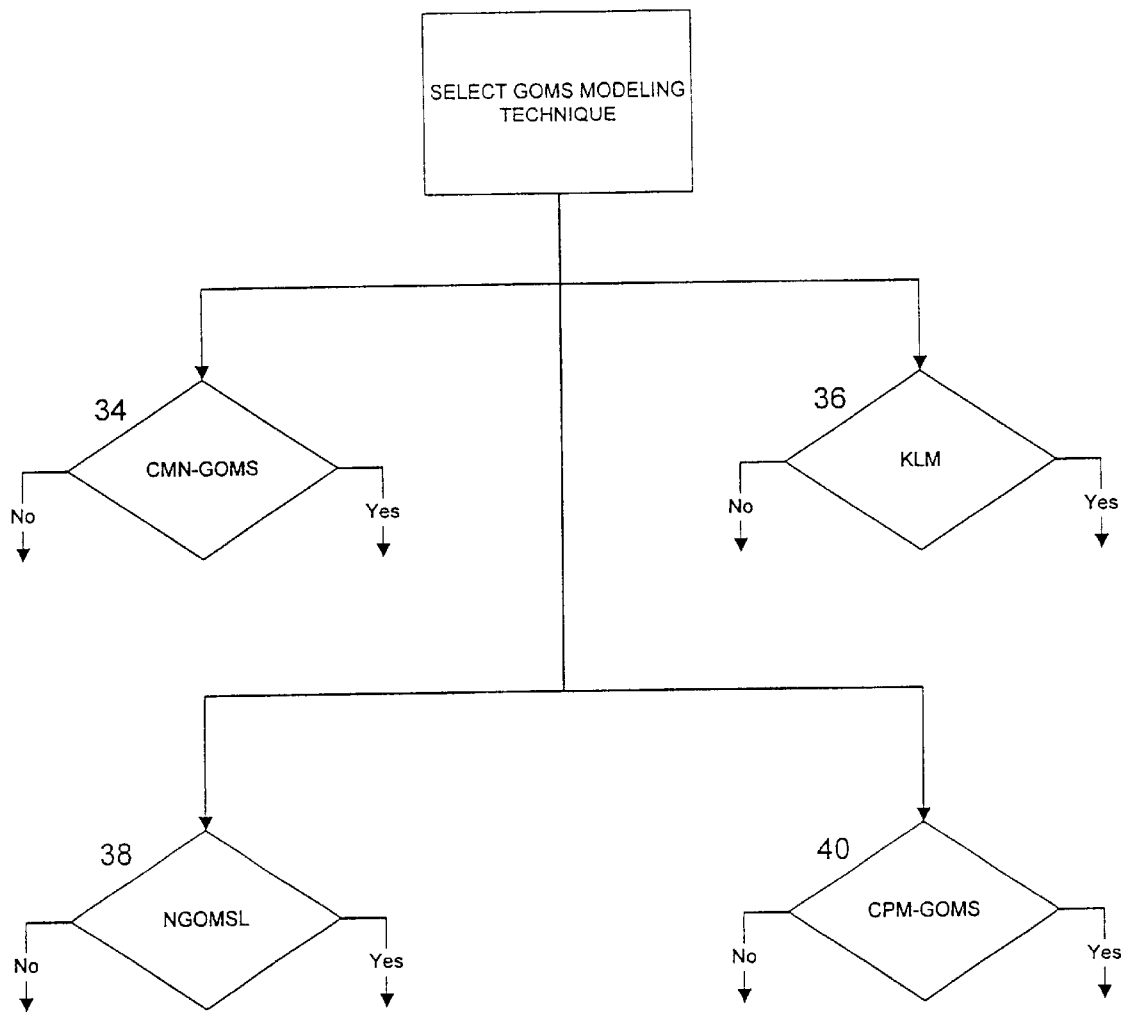
FIG. 12 is a flowchart of GOMS modeling techniques.

GOMS has developed into a family of cognitive modeling techniques. The GOMS family contains four techniques, all based on the GOMS concept of Goals, Operators, Methods, and Selection rules. All of the techniques produce quantitative and qualitative predictions of user performance on a proposed system. A decision must be made between the GOMS modeling techniques. The techniques are shown in FIG. 12 and include GMN-GOMS 34, KLM 36, NGOMSL 38, and CPM-GOMS 40. Any of the above, or other, GOMS modeling or task analysis techniques used would still be within the spirit and scope of the present invention.

For a GOMS technique to be used in the design process, the user's task must be goal-oriented, routinized skill must be involved, and the user must control the majority of task progression versus the computer system or other agents controlling the majority of task progression. Given that restriction, choosing which GOMS technique should be used in the design process is typically based on two factors that relate to the design situation. These two factors are the type of tasks the users perform and the types of design information the GOMS technique obtains.

The types of tasks the users perform are divided into serial-based or parallel-based task. Serial Operators can approximate many tasks, such as text editing. If a task can be appropriately represented by serial Operators, a serial processing GOMS technique should be used (CMN-GOMS, KLM, or NGOMSL). However, not all tasks can be approximated by serial Operators. For example, a task in which a service representative is concurrently talking to the customer and typing information into the system is more appropriately represented as tasks occurring in parallel. For these tasks, CPM-GOMS, the parallel processing GOMS technique should be used.

The types of design information the GOMS technique obtains are divided into functionality, including coverage and consistency, operator sequence, execution time, learning time, and error recovery support. Functional coverage refers to the system's ability to provide some reasonably simple and fast Method to accomplish every Goal. After the users' Goals are determined, typically all GOMS Methods can provide functional coverage. Functional consistency refers to the system's ability to provide similar Methods to perform similar Goals. NGOMSL is the most appropriate technique to use for functional consistency because it employs a consistence measure. This measure is based on learning time predictions in which a consistent interface uses the same Methods throughout for the same or similar Goals, resulting in fewer Methods to be learned.

Operator sequence refers to whether a technique is capable of predicting the sequence of Operators a user must perform to accomplish a task. CMN-GOMS and NGOMSL can predict the sequence of motor Operators a user will execute while KLM and CPM-GOMS must be supplied with the Operators. The ability of CMN-GOMS and NGOMSL to predict the sequence of Operators is useful in deciding whether to incorporate a new Method into a system. It is also useful in determining how to optimally incorporate training in the use of the new Method. Although CPM-GOMS does not predict Operator sequence for parallel processes, it can be used to examine the effects of design modifications which may alter Operator sequence.

Execution time can be predicted by any of the GOMS techniques given that the user is well practiced and makes no errors throughout the task. Due to the restrictions of thoroughly experienced users and no error performance, the predicted times are actually predictions of optimal execution times for a task. Many predictions of execution times with GOMS techniques have been documented and suggest that further empirical validation is unnecessary.

Learning time is only provided by NGOMSL. This technique measures the time to learn the Methods in the model and any information required by long-term memory to accomplish the Methods. Since absolute predictions of learning time include many complexities, NGOMSL should be limited to learning time predictions for appropriate comparisons of alternative designs.

Error recovery support refers to helping users recover from an error once it has occurred. GOMS typically recognizes whether the system offers a fast, simple and consistent Method for users to apply when recovering from errors. Any of the GOMS techniques can be used to measure the error recovery support of a system.

A table that can be used to help choose the most appropriate GOMS technique based on the type of tasks the users perform and the types of design information is shown in FIG. 13.

CPM-GOMS stands for Cognitive, Perceptual, and Motor. It performs at a level of analysis in which the user's cognitive, perceptual, and motor activities are included as simple primitive Operators. This GOMS technique allows for parallel processing, unlike the other three GOMS models. Thus, cognitive, perceptual, and motor activities can be performed in parallel as the task demands.

CPM-GOMS uses a schedule chart (PERT chart) to display the Operators. PERT charts clearly present the tasks which occur in parallel. CPM-GOMS also stands for Critical-Path Method because PERT charts calculate the critical path (the total time) to execute a task. The PERT charts serve as quantitative models as they tell how long certain activities take, and may assign numerical values to tasks. These charts are used by the system interface designers, along with the qualitative models, to design the user interface.

CPM-GOMS is based on the Model Human Processor (MHP). In the MHP, the human is modeled by three processors, namely, a perceptual processor, a cognitive processor, and a motor processor. Although each processor runs serially, processors can run in parallel with each other. CPM-GOMS directly utilizes the MHP by recognizing each of the processors that perform the Operators. It also recognizes the sequential dependencies between the processors. Because CPM-GOMS assumes that the user can perform as fast as the MHP can process, the user must be thoroughly experienced in the task. CPM-GOMS does not model novice users.

For the service representative embodiment, the CPM-GOMS technique will be chosen as the basis for the modeling technique to be used. The CPM-GOMS technique was chosen because it can most appropriately represent the parallel activities that service representatives engage in while performing their tasks for this embodiment.

As previously indicated, CPM-GOMS performs at a level of analysis in which the user's cognitive, perceptual, and motor activities are included as simple primitive Operators. Since GOMS, in general, includes only the level of detail necessary to analyze the design problem, simple primitive Operators will only be examined when necessary for this project. It is expected that discrete groups of users will show behavioral and performance differences in the accomplishment of a task at a level of analysis higher than simple primitive Operators.

The CPM-GOMS technique will incorporate the perceptual and cognitive processes together as one general processor. Thus, any internal Operators will be labeled as general mental Operators. The combining of perpetual and cognitive Operators into one classification was developed to simplify the models and to maintain a level of analysis higher than primitive Operators.

Since the CPM-GOMS uses a PERT chart to display the Operators, it can calculate the critical path of the task. The critical path is the sequence of Operators that produce the longest path through the chart. The sum of the sequence of these Operators equals the total time to execute the task. Empirical data from actual performance of observable motor Operators will be used in the PERT chart. Both empirical data and data from cognitive psychology will be used to determine execution times of the mental Operators.

These execution times are helpful to determine the overall time of execution per processor/category for each task. For example, in a hypothetical task, the service representative's execution time may be divided into 48% talking (motor operators: verbal responses), 39% listening (mental operators), 8% waiting for the system (system response), and 5% typing (motor operators: hand movements). The execution times are also instrumental when comparing different tasks, the same task in a different system, or the performance of different types of users.

Another reason CPM-GOMS technique was chosen relates to its ability to compare alternative designs that aren't currently built or prototyped. The CPM-GOMS models of the existing system can determine the effects of changes to current tasks, which in turn can facilitate the development of the proposed system. The models can also be used as baseline models for the proposed (redesigned) system. The models can be compared with models of the proposed system to examine the efficiency and consistency of the proposed system and the ability for users to convert to the proposed system.

The CPM-GOMS technique can also be used to help develop the documentation and training material. Typically, documentation should be task-oriented. GOMS provides a theory-based empirically validated, and systematic approach to determine the necessary content of task-oriented documentation and training material. In addition, since CPM-GOMS can predict execution time differences between different Methods, the most efficient Methods and Selection rules could be highlighted in the documentation and users could be educated and encouraged to adopt these in training sessions.

The CPM-GOMS technique used will document four major categories, namely, system response, customer response, mental operators, and motor operators. Mental operators include perceptual and cognitive Operators. Motor operators are divided into manual movements, verbal responses, and eye movements.

All aspects of each user's task will be sequentially categorized into cells during the task analysis. A cell is a categorized event at an appropriate level of detail. Customer response, motor operators, and system response will be recorded in the cells when the user is performing the task. Mental operators will be recorded in the cells after the completion of the task. Mental operators will be added based on empirically validated theories in cognitive psychology and input from the users.

After the task is broken into cells and all of the cells are determined and categorized, the cells are connected to each other based on their precursor needs. Next, execution times are included for each cell and then the CPM-GOMS model emerges.

There will be three levels of detail in task analysis: A, B, and C. The level "A" task analysis will be when design team members are trained to capture observed behavior while sitting and recording the service representative's actions. The level "B" task analysis will be captured primarily through videotape and keystroke data. The level "C" task analysis will be by capturing key strokes, user attention through eye tracking, and through video tape.

Task analysis detail, level "A", is focused on team members capturing behavior that can be observed while sitting next to the service representative and recording their actions manually. The steps of this level are shown in FIG. 14.

Task analysis detail, level "B", is focused on team members capturing behavior that can be observed and recorded on video while the service representative is in their normal environment or while in a laboratory environment. The recorded information will be video and audio. The steps of this level are shown in FIG. 15.

Task analysis detail, level "C", is focused on team members capturing behavior that can be observed and recorded on video and, most importantly where the service representative is looking or searching, while the service representative is in a laboratory environment. Although the recorded information will be video and audio, the focus for this level is on the eye tracking information and data. The steps of this level are shown in FIG. 16.

The information and data that is gathered during this level of task analysis can be very useful during the design phase of systems development. One particular eye tracking data set is the characteristic search patterns of the users. How the users search the screen provides some excellent insights into how the users process the information being presented on the screen. This information and data from the eye tracking analysis assists in describing how users (actually groups or categories of users, e.g., blue group) perform tasks and how the interface assists them in performing those tasks. The sequence and duration of eye movements provides valuable information into how the user is using the information on the screen to make decisions. The sequence or pattern of eye movements is an indication of the strategy that the user is employing. The duration of eye movements is an indication of the user showing attention to that particular item of detail. This knowledge of strategy and attention is important to constructing a model of user behavior, i.e., how the blue group accomplishes their tasks.

This level of task analysis is at the lowest level of detail which thus generates a lot of data. One of the potential problems with this large amount of time-oriented data is keeping the various data files properly registered. This time registration problem is compensated by, at the start and at the end, having the user perform a unique task that can be identified in all of the data files. An example of this unique task would be looking at the lower left part of the screen while pressing the "w" key for a period of five seconds.

The various data files to be discussed are key press, eye movement, video, audio, screen display, and screen display objects. The "key press" file needs to capture which keys were pressed, when they were pressed, and mouse movements. The mouse movements would only record location (the X and Y location) when the mouse is clicked or double clicked.

The "eye movement" file needs to capture the location and duration of eye fixations. These eye fixations have a minimum duration threshold of 50 milliseconds so that simple eye movements from one location to another are not included in the file.

The "video" file needs to capture the hand movements, screen display changes, notes taken by the user, and user facial expressions. This video would allow for 20 millisecond frame increments. The file format is the normal videotape format with time stamps.

The "audio" file needs to capture the voice, speech, and sound from the user, customer, computer, and other devices. The file format is the normal audiotape format with time stamps.

The "screen display" file needs to capture the image that was displayed on the screen for the user to observe. The screen image is only recorded when the image changes. The screen capture file will be in the normal format.

The "screen display objects" file needs to capture the location of the various objects that comprise the screen display.

Exemplary data file formats for key press, eye movement, screen display, and screen display objects are shown in FIGS. 17A, 17B, 17C, and 17D respectively.

Figure 18:
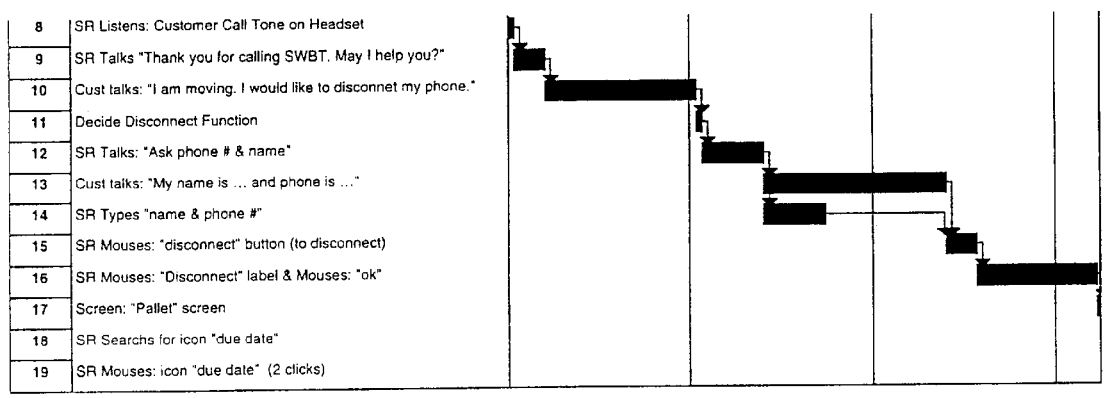
FIG. 18 is an exemplary CPM-GOMS task analysis PERT chart according to the present invention.
Figure 19:
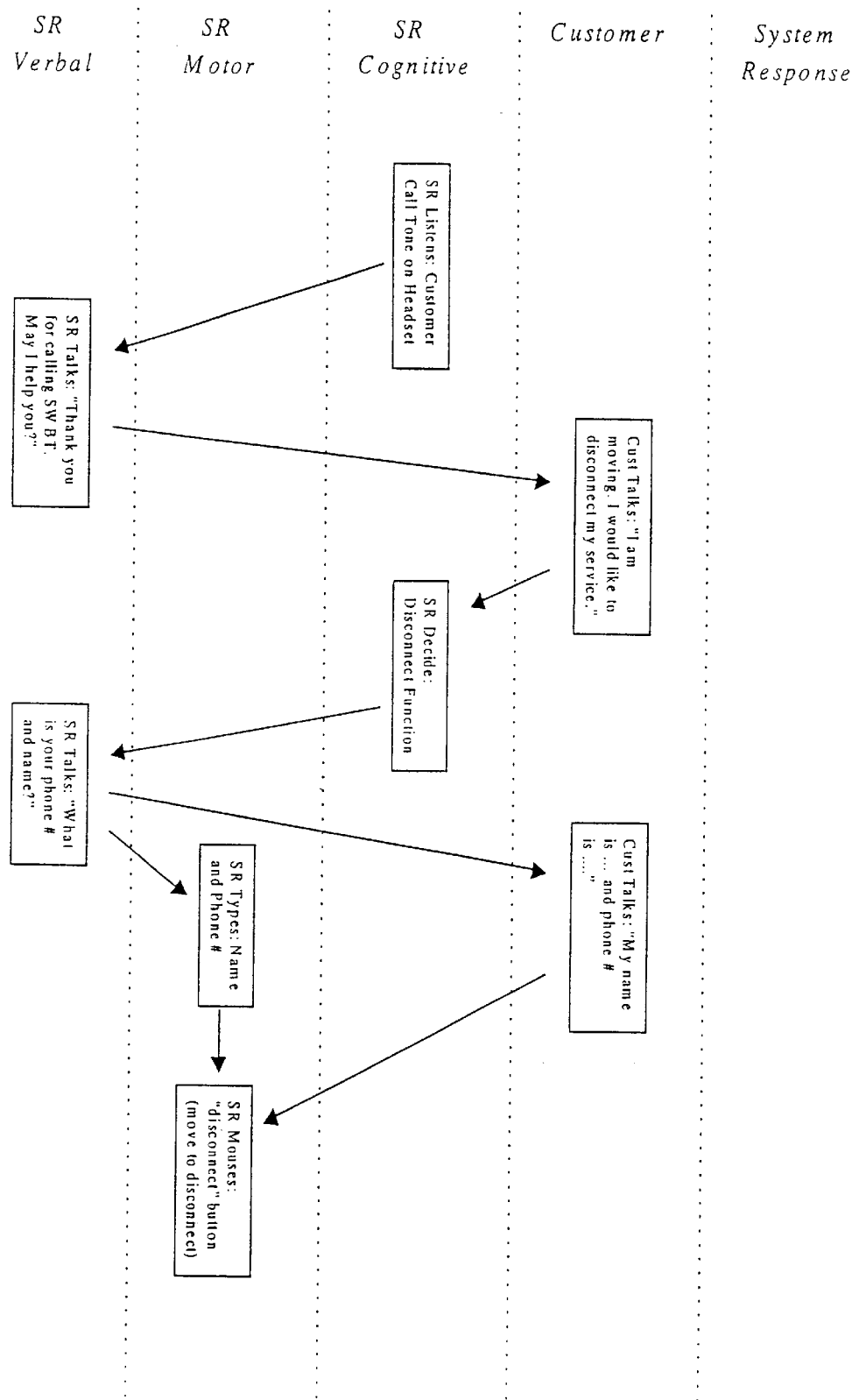
FIG. 19 is an exemplary block diagram from a PERT chart according to the present invention.

The output from the describing the behaviors activity (CPM-GOMS task analysis) is a PERT chart as shown in FIG. 18. This PERT chart is then used to create the block flow diagram in FIG. 19. Both of these are used in creating the user behavior models.

Modeling User Behavior

When the users' behaviors are well understood within a given user group, a user model can be constructed. There are two types or levels of models: qualitative and quantitative. Both of these model types are useful to the system interface design team and accomplish different objectives.

The qualitative models are statements of how users within a specific user group behave in certain situations or performing certain functions. For example, a qualitative statement for a user may be "This type of user has a great desire to navigate within the system quickly and is capable and willing to memorize short-cut keys in order to jump from screen to screen quickly." These qualitative models make a contribution to the design team by allowing design team participants to specifically represent each of the various user groups in the design process. As the various design decisions are addressed, these insights are extremely valuable, so that the various user group needs are not lost in the development process.

The quantitative models also represent the behavior of a specific user group, but in a manner that has greater detail and with greater precision. The quantitative models are more formal and incorporate the capability to make numerical performance predictions unlike the qualitative models. These models make use of programming languages, which are well suited for such representation. Items such as arrival patterns, resources allocations, task duration times are also included and combined with the flow of incoming work. These quantitative models are developed only to the degree of detail necessary to adequately represent the user groups for the design team during the system development process.

The process of building a model has some fairly well defined steps. These steps can be generalized as follows:

Establish objectives and constraints. Focus on defining the problem as precisely as possible, with clearly defined project goals. Ensure the resources are available. Determine the boundaries of the project, i.e., what can and cannot be done. Build a conceptual, preliminary model. Select effectiveness measures, factors to vary, and the levels of those factors.

Gather, analyze, and validate system data. Identify and prepare input data.

Build an accurate, useful model, including computerizing it. Verify and validate the model by confirming the model operates the way it was intended and the model is representative of the actual process.

Conduct simulation experiments. Finalize experimental design. Analyze and interpret results.

Document and present results. Assist with implementation, if requested and necessary to ensure project success. One of the most important steps in modeling building is the establishment of objectives and effectiveness metrics.

The process of describing behaviors was discussed previously. These behavioral descriptions are in the form of modified CPM-GOMS flow diagrams. These flow diagrams are analyzed by identifying common elements that exist in many of the task descriptions.

A subjective judgment is made to determine how to combine or suggest that a set of behavioral descriptions are sufficiently similar to construct the same user model. This aspect of analysis requires a large base of experience. This experience is both beneficial and worthwhile. Satisfying this subjective question of the existence and location of a set of behavioral descriptions that are sufficiently similar in nature has tremendous challenges, but is critically important. One of the major considerations in this effort is deciding the relative consistency within each user group. Or, put another way, how tightly consistent should the behavioral descriptions be within a given user group.

The greater the consistency within a user group, the greater validation of the model. At the extreme, having a large inconsistent user group is the situation that is common today where the user is viewed as one perspective. This large, inconsistent user group is not desireable, but rather a smaller, consistent set of behaviors within a group is desired. The model that is then generated can be relatively tight. However, if a given group or category is allowed to be loosely grouped or loosely defined by including a broad set of behavioral characteristics, then the set of behavioral descriptions will be correspondingly broad and the model that is generated will be relatively loose.

The actual construction of the user models from the descriptions is fairly straightforward for the external task actions, but can be challenging for the internal mental task actions.

In order to maximize the relationship between the model and the behavioral description, the model layout is similar to the description layout. The behavioral description has four categories of Service Representative Verbal, Service Representative Motor, Service Representative Cognitive, and Customer. These four categories will be mapped to the model construction also. The format of the model construction is shown in FIG. 20.

Figure 20:
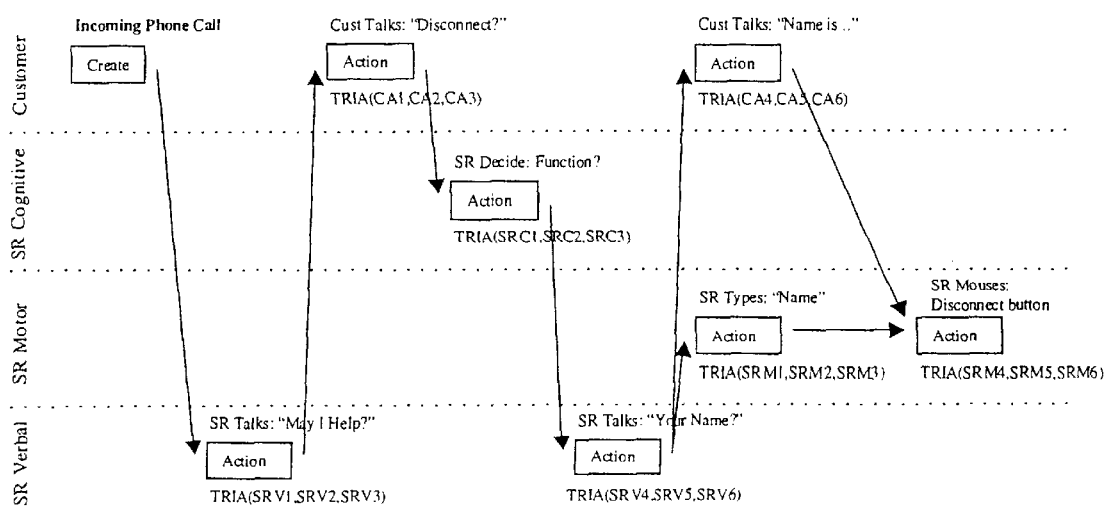
FIG. 20 is an exemplary user qualitative model according to the present invention.

The flow of the user model in FIG. 20 begins at the "create" box in the upper left corner. This "create" box represents the arrival of a phone call to this service representative. Other parts of the model, not shown, describe and represent the behavior of the arrival of phone calls. Phone calls from customers have been shown to form a pattern of arrivals dependent upon time of day, day of week, day of month, and month of year. Each customer phone call has a set of attributes or characteristics. An example of an attribute is the type of call. An example of call type is a customer wanting to disconnect their service because they are moving to Florida. The processing of this call type begins by the service representative answering the phone call, "SR Talks", with a greeting "Southwestern Bell Telephone. How may I help you?" (SR is the service representative). This action is represented with the action box in the lower left corner. The notation below this box, and the action boxes also, is a calculation for the duration of this specific action. The action's duration is how much time it will take to accomplish this action. The "TRIA" function is a common distribution used in simulation that has a minimum, mode, and maximum time period. In this case, these are represented by variables of SRV1, SRV2, and SRV3, respectively.

After the service representative asks what the customer wants, the customer replies, "Cust. Talks", that they wish to disconnect their service. Again, the TRIA function denotes the length of time that this action by the customer requires. Upon hearing the customer's request, the service representative makes a mental decision, "SR Decides", as to what operational function will accomplish the customer's request. The first item of information to begin the disconnect function is the customer's name (and phone number), so the service representative requests, "SR Talks", that information. The customer replies, "Cust. Talks", with the requested information and, as the customer is talking, the service representative begins to enter, "SR Types", the information into the system.

When the customer is finished providing their name (and phone number) and the service representative is finished entering the information into the system, the service representative moves their mouse, "SR Mouses", to the "disconnect" button on their screen and clicks the mouse button. The remaining tasks to complete the disconnect function are not illustrated.

In this example, the user model is a series of action boxes, which, by their sequence and delay time, represent how a user will interact with a customer who wishes to disconnect their service. It is important to note that this flow illustrates how one group of users would handle this type of call. A different user group who has a reference of shortcut or "hot" keys rather than using the mouse would have a different user model. In particular, rather than the extreme right box of "SR Mouses", their user model would have a box of "SR Keys". The significance of this difference is that the time duration for a "SR Keys" action is shorter than the time duration for a "SR Mouses" action.

The benefits of a user model become clearer with this example. The system or interface designers can anticipate how different user groups would interact with the various screens, how long each user group would require to process each of the various screens, and can identify potential improvements so that the screens are better suited to the characteristics of the different user groups.

The user models that will be initially constructed will be verified and validated to a certain extent. The models can be improved dramatically by using a refining stage after the initial models are constructed. The initial models will appear to be valid to, possibly, a degree that may be acceptable. However, it is important to note that the model's validity, for almost all models, will be improved by using the procedure discussed later. It is extremely useful to encourage the user model designers to enhance the validity for a potentially small price (in terms of time and effort).

One purpose of constructing a user model is to have the ability to predict user behaviors in the future. There are two primary purposes of a user model that is predictive in nature. The first purpose being in the design phase of system development. It is of great value for the interface designer to be able to understand the user behavior for a given design. The designer can better evaluate various alternative designs and their impact on user performance. The second purpose focuses on operational performance. In most cases, the impact of a new system design on overall business process cannot be predicted. Of course, operations management is very concerned with the impact of a new, or re-designed, system on overall performance. In fact, most system development projects are justified on improving overall performance. It is important that the design of these new systems support the improvement of performance metrics.

Defining the metrics used to analyze the outcomes of the user model is critical, because these simulation outcomes will assist in evaluating the various interface designs. These interface designs will also assist in justifying the cost/benefit of a development project. One example of a primary simulation outcome is shown in FIG. 21. The data in FIG. 21 is for illustration purposes only and does not represent actual results.

One use of the information in FIG. 21 is an illustration of where time is consumed by call category. For example, for a Disconnect call type, 83% of the time is consumed with talking (both customer and service representative). Ten percent of the time is consumed with system response, 4% of the time is consumed with keying activity, and 3% of the time is consumed with reading information from the screen. For this call type, the benefits of spending resources towards reducing the keying time would probably be limited because keying is only 4% of the total time. However, investigating the sub-activities within the talking function could have dramatic impact of this call type. A 24% improvement in the keying function would represent a 1% (25% of 4%) overall improvement in time duration, while a 25% improvement in the talking function would represent a 21% (25% of 83%) overall improvement in time duration. The usefulness of this type of information (that is contained in FIG. 21) is increased when the team is aware of effective resource allocation. These type of simulation outcomes can be an excellent source of guidance for the design team.

A table showing exemplary steps to construct the user model with CPM-GOMS flow diagram, using the service representative embodiment, is shown in FIG. 22. After the model is developed, it should be refined. An exemplary procedure to refine the model, using the service representative embodiment, is shown in FIG. 23.

The present invention has been illustrated using an embodiment of the service representative using a computer interface, but is not limited by this embodiment. This invention can be applied to modeling any type user for any type of user interface, such as airplane cockpits, machine control panels, motor vehicle dashboards, boat control panels, as well as computer graphical user interfaces. This invention is not limited by these, but is meant to cover these and other applications or embodiments that are within the spirit and scope of the invention.

What is claimed:

1. A method for modeling types of system users, the models being used to provide data for designing a system user interface, comprising:

categorizing behaviors of a plurality of types of users into at least two groups of users, each group including at least one user and at least one other user, the at least one user having behavior that differs from behavior of the at least one other user;

describing behaviors of each group of users, based on behaviors of selected users from each group; and modeling the described behaviors of each group to design a desired user interface.

2. The method recited in claim 1 wherein the behaviors include navigation behaviors.

3. The method recited in claim 1 wherein the behaviors include parallel processing behaviors.

4. The method recited in claim 1 wherein the behaviors include customer sales behaviors.

5. The method recited in claim 1 wherein categorizing comprises charting the behaviors on a chart having two or more dimensions.

6. The method recited in claim 5 wherein categorizing comprises charting the behaviors on a three dimensional chart.

7. The method recited in claim 5 wherein categorizing comprises charting the behaviors on a four dimensional chart.

8. The method recited in claim 5 wherein the dimensions include performance measures.

9. The method recited in claim 5 wherein the dimensions include cognitive workload measures.

10. The method recited in claim 5 wherein the dimensions include behavioral measures.

11. The method recited in claim 5 wherein the dimensions include user characteristic measures.

12. The method recited in claim 5 wherein the dimensions include a combination of performance, cognitive workload, behavioral, and user characteristic measures.

13. The method recited in claim 1 wherein describing is related to examining the behaviors for similarities within each group.

14. The method recited in claim 1 wherein describing is related to examining the behaviors for differences between each group.

15. The method recited in claim 1, wherein describing comprises listing tasks by frequency and importance and selecting a task from the most important and frequent tasks for detailed task analysis.

16. The method recited in claim 15 wherein the detailed task analysis comprises capturing at least one of the perceptual, cognitive, and motor stages of human behavior.

17. The method recited in claim 16 further comprising quantifying each stage as to processing speed and cognitive load.

18. The method recited in claim 15 wherein the detailed task analysis is accomplished by using at least one of a GOMS and modified GOMS methodology.

19. The method recited in claim 1 wherein the models include qualitative models.

20. The method recited in claim 19 wherein the qualitative models include how the users within a specific group behave in certain situations.

21. The method recited in claim 19 wherein the qualitative models include how the users within a specific group perform certain functions.

22. The method recited in claim 1 wherein the models include quantitative models.

23. The method recited in claim 22 wherein the quantitative models incorporate the capability to make numerical performance predictions.

24. The method recited in claim 1 wherein the models of the behaviors are constructed in an interactive process that results in the models representing the strategies and activities for each group.

25. The method recited in claim 24 further comprising validating the models.

26. The method recited in claim 25 wherein validating the models uses actual data.

27. A method for modeling behaviors of interface users, the models being used to provide data for designing a system user interface, comprising:

creating a list of user behaviors;

identifying important behaviors, based on desired goals for a system interface;

obtaining data related to the important behaviors from a plurality of users;

graphing the data, axises of the graph being related to at least two important behaviors of the plurality of users;

identifying clusters in the graphed data, the clusters representing groups of users with similar important behaviors, each user group having at least one user and at least one other user, the at least one user having at least one important behavior that differs from important behavior of the at least one other user;

selecting at least one user from each user group to represent the user group's behavior;

obtaining additional data from the selected users, the additional data related to the selected users' behaviors;

describing the behavior of each group users' based upon the additional data obtained from the selected users; and creating models of said selected users' behaviors to design a desired system user interface, based on the descriptions of the selected users' behaviors.

28. The method recited in claim 1 further comprising creating a user interface using information from the models.

29. The method recited in claim 28 wherein the plurality of users' performance is improved when using the user interface.

30. The method recited in claim 14 further comprising designing a user interface using information from the models.

31. The method recited in claim 30 wherein the plurality of users have improved performance using the user interface.

* * * * *

UNITED STATES PATENT AND TRADEMARK OFFICE
CERTIFICATE OF CORRECTION

PATENT NO. : 6,405,159 B2
DATED : June 11, 2002
INVENTOR(S) : R. Bushey et al.

It is certified that error appears in the above-identified patent and that said Letters Patent is hereby corrected as shown below:

Column 24,
Lines 44-55, delete the text of claim 1 in its entirety and substitute the following therefor:
-- A method for modeling types of system users of a telecommunications system, the system users being customer service representatives that use a telecommunications system customer service representative interface, the models being used to provide data for designing the telecommunications system customer service representative interface, comprising:

categorizing behaviors of a plurality of types of customer service representative that use the telecommunications system customer service representative interface into at least two groups of users;
    describing behaviors of each group of users, based on behaviors of selected users from each group; and
    modeling the described behaviors of each group to design a desired telecommunications system customer service representative interface. --

Column 26,
Lines 7-32, delete the text of claim 27 in its entirety and substitute the following therefor:
-- A method for modeling behaviors of telecommunications system customer service representative interface users, the models being used to provide data for designing the telecommunications system customer service representative interface, comprising:

creating a list of user behaviors;
    identifying important behaviors, based on desired goals for the telecommunications system customer service representative interface;
    obtaining data related to the important behaviors from a plurality of users;
    graphing the data, axes of the graph being related to at least two important behaviors of the plurality of users;

UNITED STATES PATENT AND TRADEMARK OFFICE
CERTIFICATE OF CORRECTION

PATENT NO. : 6,405,159 B2
DATED : June 11, 2002
INVENTOR(S) : R. Bushey et al.

It is certified that error appears in the above-identified patent and that said Letters Patent is hereby corrected as shown below:

<u>Column 26 cont'd,</u>
 identifying clusters in the graphed data, the clusters representing groups of users with similar important behaviors;
 selecting at least one user from each group to represent the user group's behavior;
 obtaining additional data from the selected users, the additional data being related to the selected users' behaviors;
 describing the behavior of each group of users based upon the additional data obtained from the selected users; and
 creating models of said selected users' behaviors to design a desired telecommunications system customer service representative interface, based on the descriptions of the selected users' behaviors. --

Signed and Sealed this

First Day of April, 2003

JAMES E. ROGAN
*Director of the United States Patent and Trademark Office*